United States Patent
Campbell et al.

(10) Patent No.: US 10,818,914 B2
(45) Date of Patent: Oct. 27, 2020

(54) CARBONIZED MUSHROOM ELECTRODES AND METHODS

(71) Applicant: The Regents of the University of California, Oakland, CA (US)

(72) Inventors: Brennan Campbell, Reno, NV (US); Robert Ionescu, Sunnyvale, CA (US); Cengiz S Ozkan, San Diego, CA (US); Mihrimah Ozkan, San Diego, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 46 days.

(21) Appl. No.: 15/554,700

(22) PCT Filed: Mar. 4, 2016

(86) PCT No.: PCT/US2016/021000
§ 371 (c)(1),
(2) Date: Aug. 30, 2017

(87) PCT Pub. No.: WO2016/141336
PCT Pub. Date: Sep. 9, 2016

(65) Prior Publication Data
US 2018/0076447 A1     Mar. 15, 2018

Related U.S. Application Data

(60) Provisional application No. 62/128,793, filed on Mar. 5, 2015.

(51) Int. Cl.
*H01M 4/00* (2006.01)
*H01M 4/1393* (2010.01)
(Continued)

(52) U.S. Cl.
CPC ....... *H01M 4/1393* (2013.01); *H01M 4/0471* (2013.01); *H01M 4/587* (2013.01); *H01M 10/052* (2013.01); *H01M 10/0568* (2013.01)

(58) Field of Classification Search
CPC ............. H01M 4/0471; H01M 4/1393; H01M 10/0568; H01M 10/052; H01M 4/587
See application file for complete search history.

(56) References Cited

U.S. PATENT DOCUMENTS

| | | | |
|---|---|---|---|
| 3,809,530 A | | 5/1974 | Gerrans |
| 4,945,014 A | * | 7/1990 | Miyabayashi ...... H01M 4/0459 423/445 R |

(Continued)

FOREIGN PATENT DOCUMENTS

WO    WO-2016141336 A1    9/2016

OTHER PUBLICATIONS

Karthikeyan et al ("Interfacial electron transfer and bioelectrocatalysis of carbonized plant material as effective anode of microbial fuel cell", Electrochimica Acta, vol. 157 (2015), p. 314-323).*

(Continued)

*Primary Examiner* — Cynthia H Kelly
*Assistant Examiner* — Monique M Wills
(74) *Attorney, Agent, or Firm* — Schwegman Lundberg & Woessner, P.A.

(57) ABSTRACT

A carbonized mushroom tissue electrode material and methods are shown. In one example, carbonized mushroom tissue is used as an electrode in a battery, such as a lithium ion battery. A battery, comprising: a first electrode, including: carbonized tissue from a mushroom; a second electrode; and an electrolyte in contact with both the first electrode and the second electrode.

11 Claims, 24 Drawing Sheets

(51) Int. Cl.
  *H01M 4/04* (2006.01)
  *H01M 10/052* (2010.01)
  *H01M 10/0568* (2010.01)
  *H01M 4/587* (2010.01)

(56) References Cited

U.S. PATENT DOCUMENTS

| | | | |
|---|---|---|---|
| 2002/0122973 A1* | 9/2002 | Manev | H01M 4/133 |
| | | | 429/52 |
| 2011/0039164 A1 | 2/2011 | Akers et al. | |
| 2012/0288589 A1 | 11/2012 | Chalupa et al. | |
| 2014/0104754 A1 | 4/2014 | Lipka et al. | |
| 2016/0248100 A1* | 8/2016 | Joo | H01M 4/405 |

OTHER PUBLICATIONS

International Application Serial No. PCT/US2016/021000, International Search Report and Opinion dated May 5, 2016, 7 pgs.
International Application Serial No. PCT/US2016/021000, International Preliminary Report on Patentability dated Sep. 14, 2017, 6 pgs.
Chinese Application Serial No. 201680013916.8, Office Action dated Dec. 27, 2019, w/English Translation, 15 pgs.
Karthikeyan, Rengasamy, et al., "Interfacial electron transfer and bioelectrocatalysis of carbonized plant material as effective anode of microbial fuel cell", Electrochimica Acta, 157, (Jan. 8, 2015), 314-323.

* cited by examiner

CARBONIZED MUSHROOM ELECTRODES AND METHODS

RELATED APPLICATION

This application is a U.S. National Stage Filing under 35 U.S.C. 371 from International Application No. PCT/US2016/021000, filed on Mar. 4, 2016. and published as WO 2016/141336 Al on Sep. 9, 2016, which claims priority to U.S. Provisional Patent Application No. 62/128,793, entitled "CARBONIZED MUSHROOM ELECTRODES AND METHODS," filed on Mar. 5, 2015, each of which is incorporated herein by reference in its entirety.

STATEMENT OF U.S. GOVERNMENT SUPPORT

This invention was made with government support awarded by the NSF MRSEC; Temiz Energy Company; and UC-Riverside Office of Research. The government has certain rights in the invention.

TECHNICAL FIELD

This invention relates to carbonized mushroom electrodes and methods. In one example, this invention relates to carbonized mushroom electrodes for lithium ion batteries.

BACKGROUND

Improved batteries, such as lithium ion batteries are desired.

DETAILED DESCRIPTION

Figure 1:
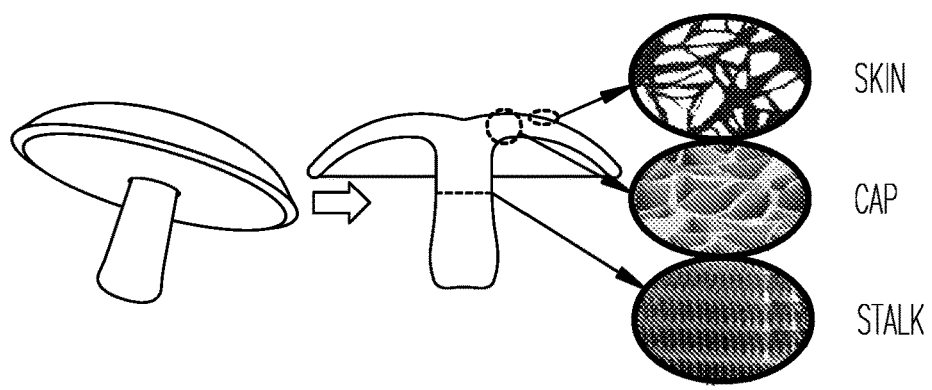
FIG. 1 shows a schematic representation of the PM specimen, sectioning process and the modeled architecture of CST, CT, and ST, respectively, according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Three unique, biomass-derived, freestanding carbon structures were investigated via electron microscopy, elemental analysis, and x-ray diffraction analysis for the first time. Carbonization of three distinct tissues of Portobello mushroom was used to synthesize the carbonaceous microarchitectures, which may have potential use in various real-world applications.

Functional carbonaceous materials are becoming increasingly attractive because of their light weight, low cost, versatility, mechanical strength and electronic conductivity. Carbons of varying micro and nanostructures are potentially useful in a multitude of applications, from bulk and nanoscale materials, to structural and energy storage materials. The sources of carbon chosen for engineering purposes depends on the processing techniques necessary to produce such carbon, its scalability, and the specific properties desired. For example, carbon nanotubes (CNTs) can be produced in a variety of ways. Some of the highest quality achieved in CNTs, however, is via the chemical vapor deposition (CVD) process, or similar gas-phase techniques, using such gaseous precursors as methane, ethylene, or acetylene. CNT-like structures have also been conceived through alternative methods. One of the first methods of CNT synthesis was the arc discharge method, however the products properties, dimensions, purity and alignment is much more controlled with CVD. Amorphous carbons are also being studied for their diverse applications, and their ability to form pores of various sizes, acquiring microporosity (<2 nm pores), mesoporosity (2<x<50 nm pores) or macroporosity (50< nm pores). Ouyang, et al., for instance, have recently made progress in achieving amorphous, microporous carbon spheres with high polydispersity through polystyrene hypercrosslinking and hydrothermal decomposition. The resultant nanospheres have great potential use in batteries, catalysis, medicine, etc. Carbonaceous foams are also of increasing interest, due to their freestanding nature, interconnectedness, and applications as bulk materials. A carbonaceous foam has been developed as a lithium-sulfur battery electrode, with macroporosity as well as mesoporosity. Using both a silica hard template as well as triblock copolymer soft templates, a phenolic resin was introduced and pyrolyzed to form the porous carbon monolith Similar carbon foam-like structures have been obtained through the carbonization of biomass in the absence of oxygen. This method of bio-mediation yields diverse micro and nanostructured carbon materials, which can often be used as a free standing monolith, or milled to form powders. A biomass-derived carbon foam was developed by liquefying birch sawdust into its resinous constituents, until it was able to become foamed and carbonized. While a high surface area and bulk density were accomplished, the process required numerous steps, several toxic solvents, and strong acids and bases, ultimately making it an economically and environmentally costly material to scale up.

For the first time, we report on the carbonization-induced transformations of three specific sections of *Agaricus bisporus*, commonly known as the Portobello mushroom (PM). The elemental compositions and structural characteristics of Portobello sections were analyzed using various spectroscopic and microscopic techniques to elucidate unique tissue-specific features and morphologies. The sections under study were the cap, stalk, and cap skin, each having distinct post-carbonization microstructures, which have profound potential to serve as functional and structural carbonaceous materials across various industries. The resulting structures are obtained facilely through a low-cost and scalable heat-treatment process that requires no expensive solvents, precursors, or work-ups. In this work, freestanding carbonaceous materials were synthesized via heat treatment of various tissues of the fungal fruiting body of *A. bisporus*. As summarized in FIG. 1, PMs were obtained, tissue samples were sectioned using razor blades and hole punches, and the samples were pyrolyzed. The carbonized PM tissues under study were: cap tissue (CT), stalk tissue (ST) and cap skin tissue (CST). Initial SEM imaging of the carbonized PM tissue morphologies confirmed that the microstructures of the resulting carbonaceous materials were distinct from one another. What is more, the 3D configurations of each respective microstructure seem to have compelling functional patterns, which could be correlated to the biological utility of a living PM. While the CT displayed a random, cavernous foam-like microarchitecture, the ST exhibits a unidirectional sinter column-like arrangement, and the CST forms thin, interconnected carbon ribbons, most often nanoribbons.

A typical experiment was carried out as follows: organic PMs were purchased from local markets and cleaned with DI $H_2O$. The stalks were removed from the caps, the skins were peeled from the caps, and the gills (located under the "hood" formed by the cap) were scraped out. Next, razor blades were used to slice the cap tissue into thin slices (~5 mm), as was the stalk tissue. The stalk tissue was sliced both vertically and horizontally to observe directionality of the microstructure. Using a 15 mm hole punch, round disk-shaped samples were obtained from the cap, stalk and skin samples. The samples were then placed on a silicon substrate. All samples were placed in a vacuum oven at 80° C. for 24 hours to remove as much moisture as possible. An additional silicon wafer was placed on top of the dried samples, so that they were "sandwiched" between silicon wafers (the sandwich setup is to encourage a flat sample during carbonization; otherwise, they would tend to flex and deform). This setup was then transferred to a tube furnace. Under 700 torr, Argon gas was flowed at 300 sccm, and the temperature was ramped from room temperature to 600° C. over 60 minutes. The temperature was held at 600° C. for 5 hours, and then allowed to cool slowly. The CTs, STs and CSTs were removed and analyzed. A number of the samples were studied as-synthesized, while others were washed in DI $H_2O$ to further understand the compositions.

Figure 2:
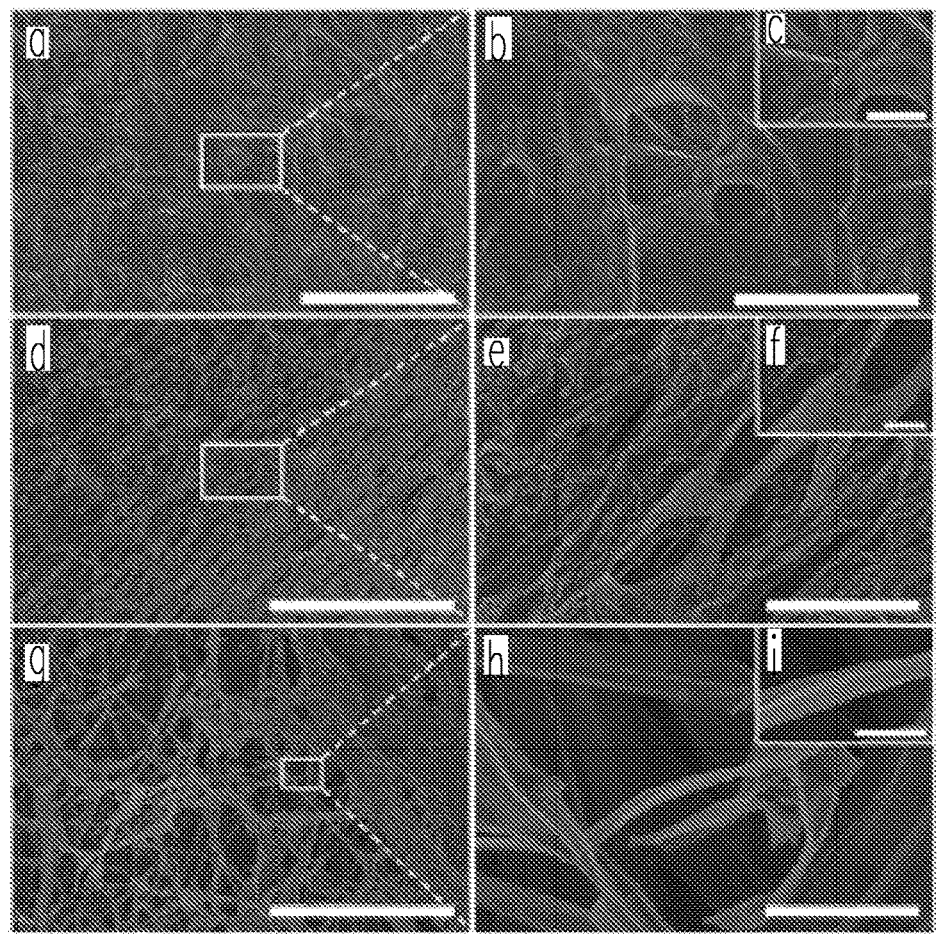
FIG. 2 shows SEM micrographs, low to high magnification, of CT (a-c) (scale bars=200 µm, 40 µm, 10 µm), ST (d-f) (scale bars=400 µm, 50 µm, 10 µm), and CST (g-i) (scale bars=300 µm, 20 µm, 4 µm), according to an example of the invention.
Figure 15:
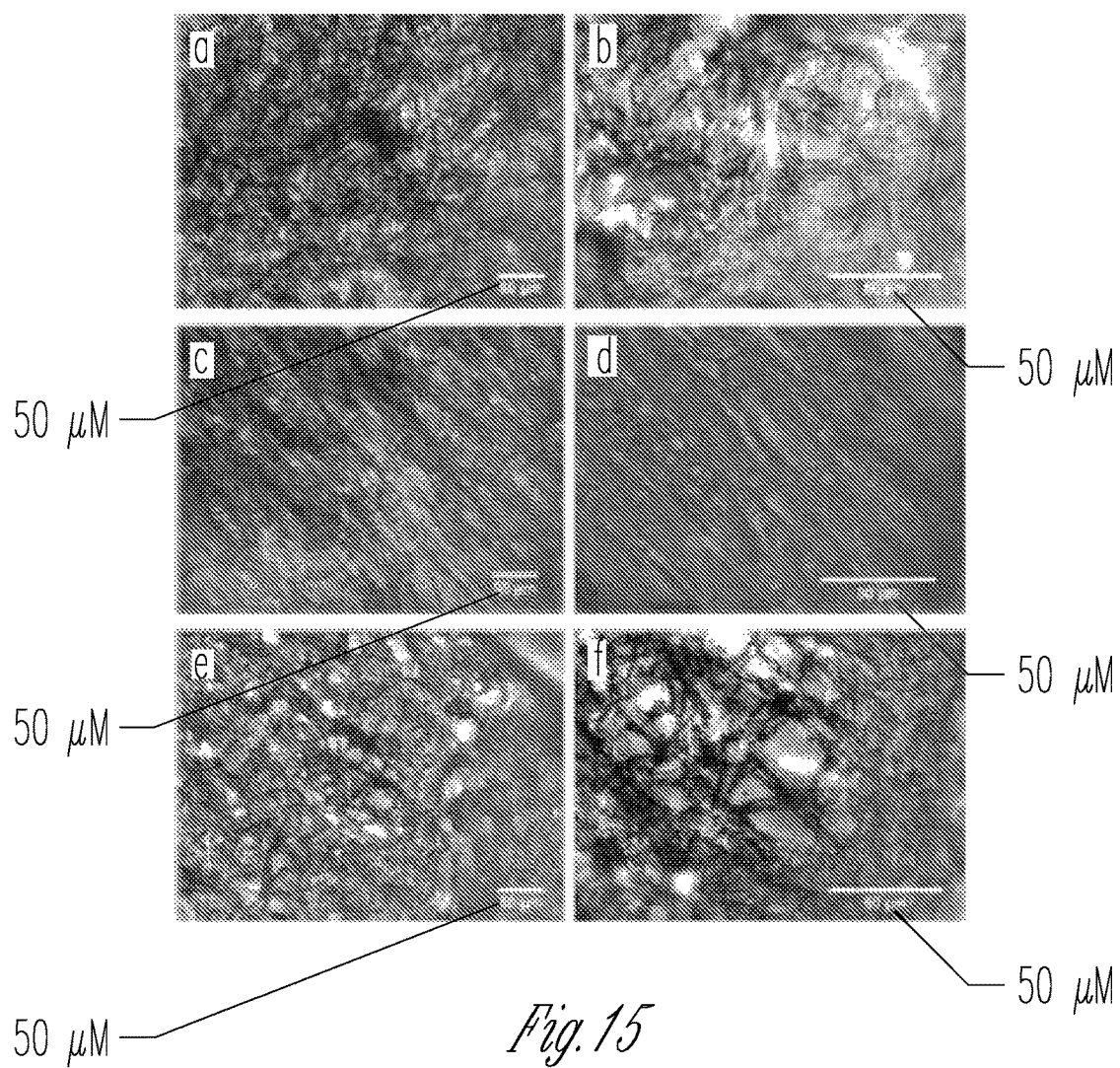
FIG. 15 shows optical micrographs of dehydrated, non-carbonized PM sections, including cap tissue (a,b), stalk tissue (c,d), and cap skin tissue (e,f) (all scale bars=50 µm) according to an example of the invention.
Figure 16:
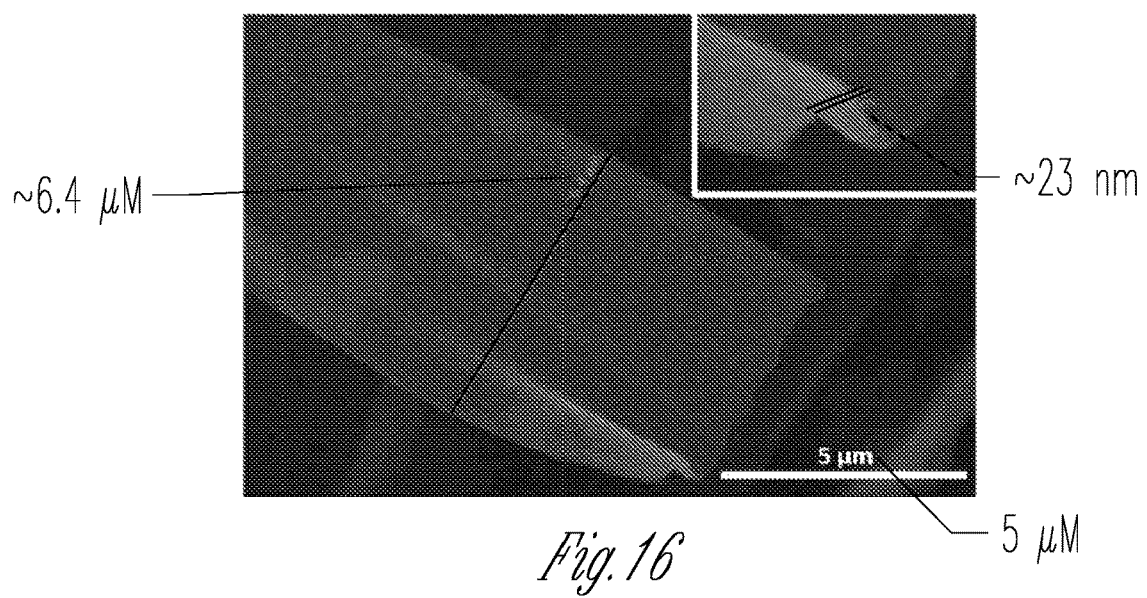
FIG. 16 shows SEM micrograph of a carbon nanoribbon resulting from carbonization of CST, including dimensions of the width (a) and approximate thickness (b) of the ribbons according to an example of the invention.

Morphologies of the CTs, STs and CSTs were studied using scanning electron microscopy (SEM). FIG. 2a-c capture the general microstructure of the CTs, which is a disordered carbon foam-like structure. The walls of the foam are between a few microns and several tens of microns. While certain local spots resemble ribbons, others are very thick. The structure is also decorated with small, round pockets, which, from later study, contain concentrated salts and minerals. It is hypothesized that during drying, escaping moisture causes naturally occurring biological salts to localize into pockets, which then swell as the temperature increases during carbonization. During microanalysis, and with the right beam energy, the pockets had a tendency to react to the electron beam and rupture. A vertical ST section is shown in FIG. 2d-f, revealing an intriguing microstructure resembling stacked, unidirectional sinter columns At low magnification (FIG. 2d), the uniform aligned ordering of the sinter columns is evident. The linear direction from the lower-left hand corner of the image to the upper-right hand corner is parallel to the line formed from the base of the PM stalk to the top, where the cap is attached. It is thus inferred that, in the live PM specimen, this arrangement contributes to the strength of the stalk and the ability of the stalk structure to support the large cap. The cap of a mature PM can make up anywhere between 70-80% of the weight of the entire fruiting body, according to our own gravimetric measurements. The stalk has a relatively small radius, and yet it must support the mushroom cap that is significantly more massive. Typically, the diameter of the middle of the sinter columns are anywhere between 5-10 μm, while the bases of the columns and connection points are several tens of microns thick. There is also evidence that the ordered columns are hierarchical in nature. Optical microscopy, in FIG. 15, of the stalk tissue before carbonization seems to indicate that larger columns are comprised of smaller fibers, which may contribute to the size variation of columns seen under SEM. Similar to the CTs, the STs appear to contain salt pockets, seen clearly in FIG. 2e. Finally, the CST micrographs display an interconnected carbon nanoribbon architecture, observed in FIG. 2g-i. This structure is distinct from the CT and ST, in that these ribbons are extraordinarily thin: approximately 23 nm in thickness, more clearly seen in FIG. 16. The low thickness of the ribbons effectively renders them transparent under SEM. The width of the nanoribbons varies from 5-6 μm to tens of microns. While the CST samples do exhibit some salt patches and pockets, they are less prominent in comparison to the other carbonized tissues. Rather, they predominantly express patches of surface salts, diameters of which range from the nanoscale to multiple microns (see FIG. 2i). The generally high aspect ratio of the CST lends to the hypothesis that these nanoribbon-like carbon structures, depending on processing temperature, would exhibit high performance in devices which require high surface area, such as electric double-layer supercapacitors, which depend on the ability to store and deliver surface charge.

Figure 3:
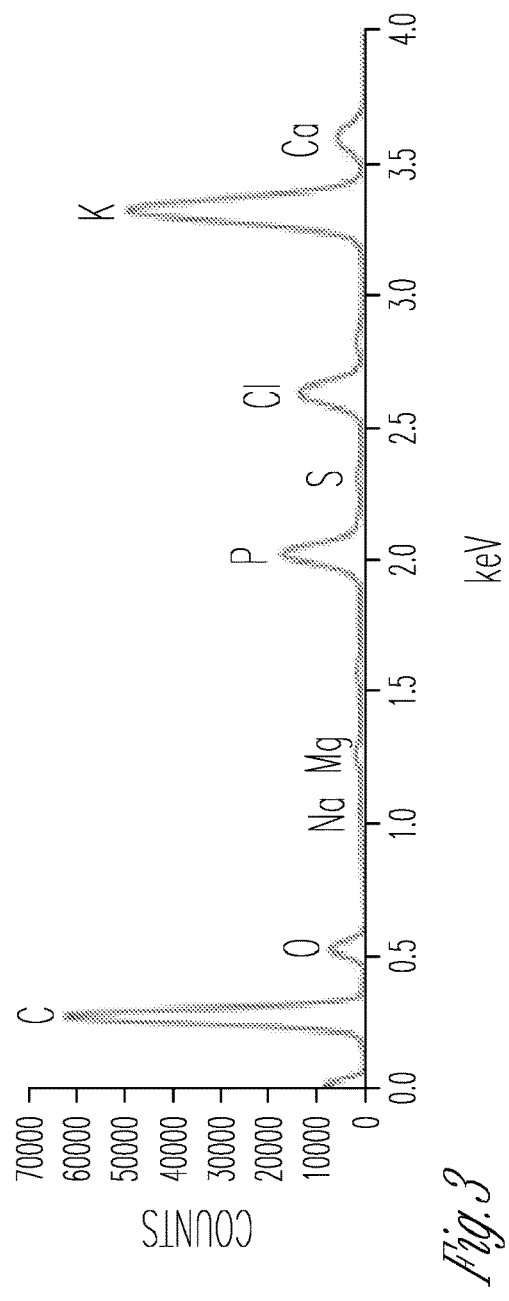
FIG. 3 shows elemental mapping and EDS spectrum (d) of unwashed CT, according to an example of the invention.
Figure 4A:
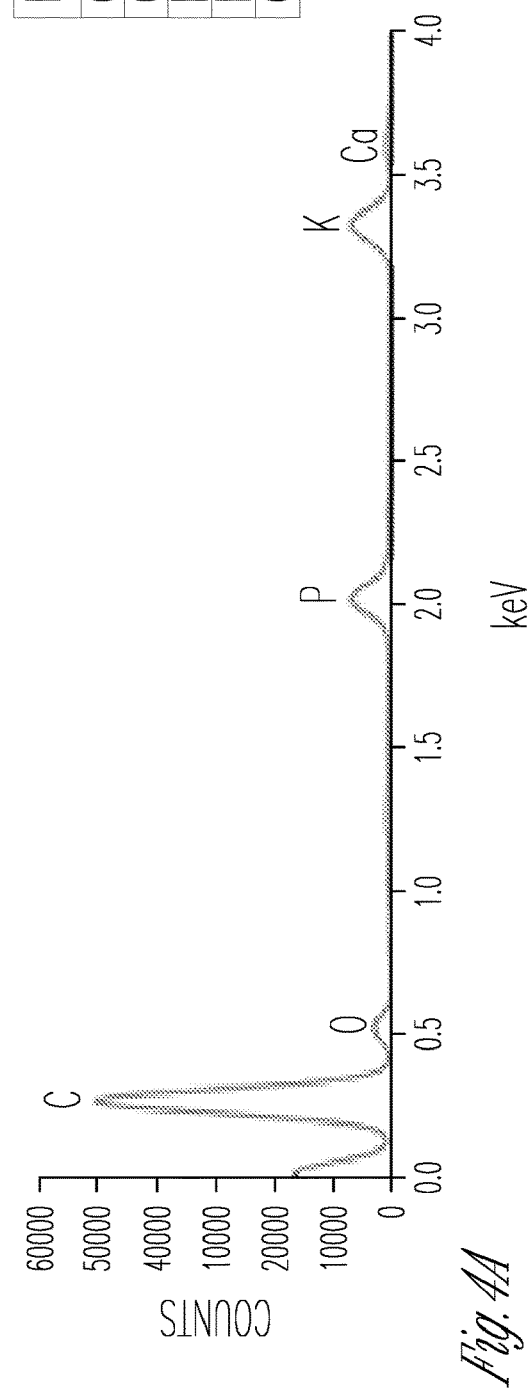
FIG. 4A shows elemental mapping and EDS spectrum (d) of DI H2O washed CT., according to an example of the invention.
Figure 4B:
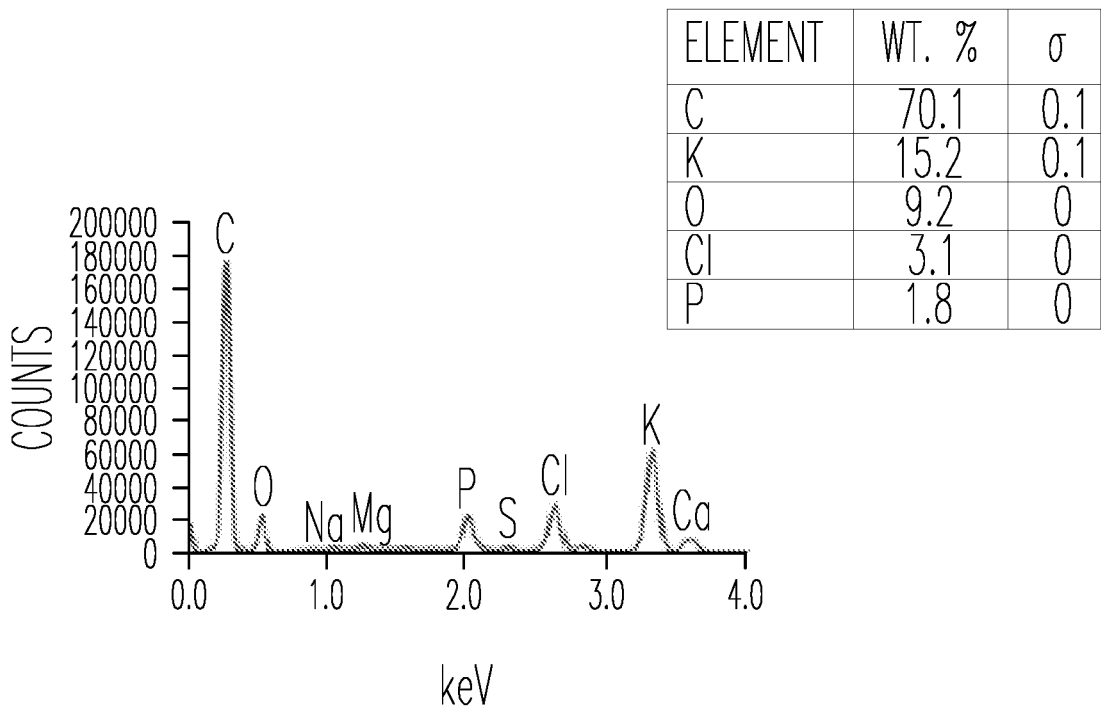
FIG. 4B shows elemental mapping and EDS spectrum (d) of unwashed carbonized ST and EDS spectrum (g) of DI H2O washed ST, according to an example of the invention.
Figure 4B:
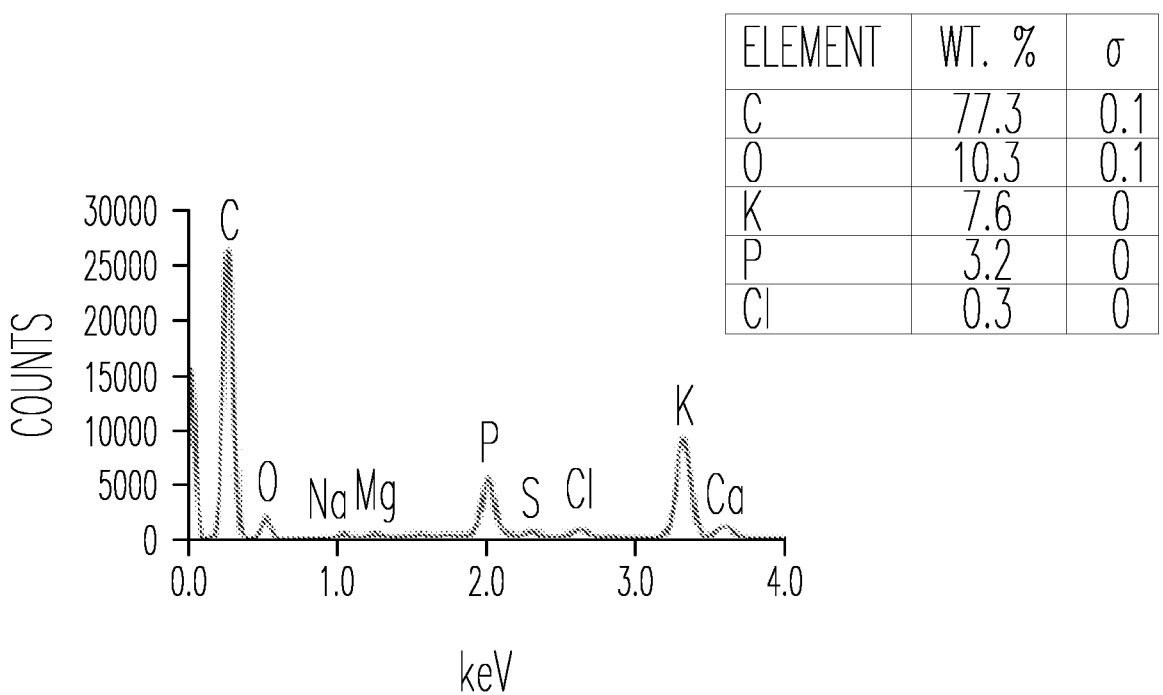
Figure 4C:
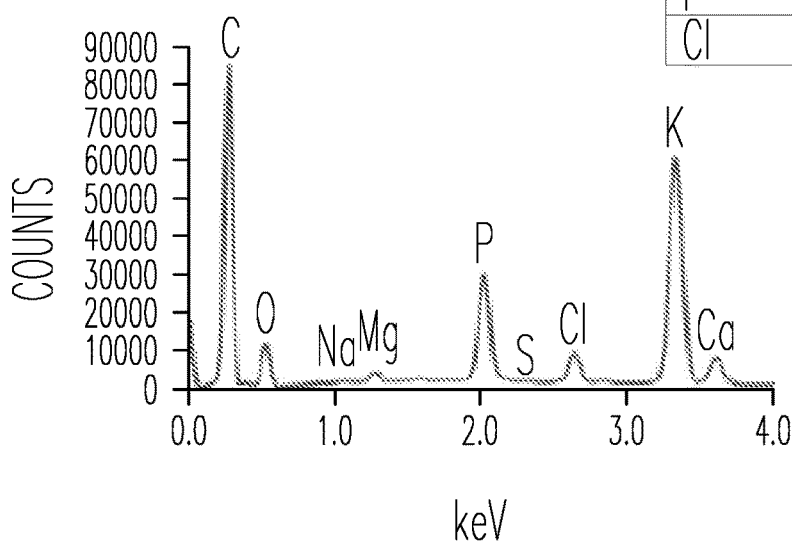
FIG. 4C shows elemental mapping and EDS spectrum (d) of unwashed carbonized CST and EDS spectrum (g) of DI H2O washed CST, according to an example of the invention.
Figure 4C:
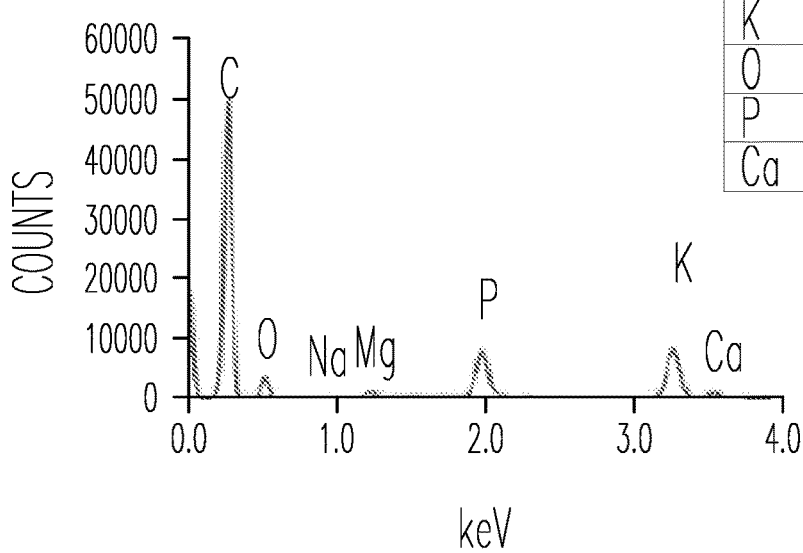

In addition to observing morphology, compositional analysis was conducted on the PM samples. Using high-resolution energy-dispersive X-ray spectroscopy (EDS), outstanding resolution was achieved in terms of the elemental distribution of the CT, ST, and CST. Specifically, elemental mapping of the CT both pristine and unwashed, and after soaking/washing in DI $H_2O$ overnight, in FIG. 3 and FIG. 4A, respectively. The corresponding elemental composition of the ST and CST, before and after DI $H_2O$ washing, are included in FIG. 4B and 4C. A defining attribute of this analysis is the presence of biological salts that are present before the soaking/washing, and are dramatically reduced after soaking/washing. Interestingly, the salts become located in pockets of various sizes. These disappear in the post-wash. While the weight percentage of oxygen is marginally changed from DI $H_2O$ washing, carbon is significantly increased, and nearly every other major mineral present is decreased. Notably, the K and Cl peaks are diminished from 16 and 3.3 wt. %, respectively (FIGS. 3) to 5.1 and virtually 0 wt. %, respectively (FIG. 4A).

Thus, the primary constituents of the mineral elements found in the PM are K and P, which is consistent with literature values for fresh *Agaricus* species. The P content remains relatively constant after DI $H_2O$ washing; this is hypothesized to be partially due to the relatively low carbonization temperature of 600° C., which may only lend minerals on the surface of the carbon to be washed away. P and other elements are probably still entrapped within bulk carbon, inaccessible by water. The phenomenon of salt-pocketing upon carbonization of this particular fungal biomass has important implications when it comes to carbon microarchitecture engineering; depending on heat-treatment temperature, these pockets may serve as a semi-hard template for further synthesis, for example Furthermore, this phenomenon should compel further comparative study into the roles of biological salts in carbonization of other various organisms, such as plant matter, due to the differences in organic polymer/oligomer compositions. The organics in the cell walls of *A. bisporus*, unlike plants, contain a relatively high concentration of the polysaccharide chitin, upwards of about 10% dry mass, with the stalk tissues containing slightly higher concentrations. Chitin serves as an important, nitrogen-containing structural polysaccharide for vertical growth of the fungal fruiting body, and is vital for the fungus' survival through spore dispersal. Scanning electron microscopy and energy-dispersive X-ray spectroscopy characterization was performed using an FEI Nova NanoSEM450.

Figure 5:
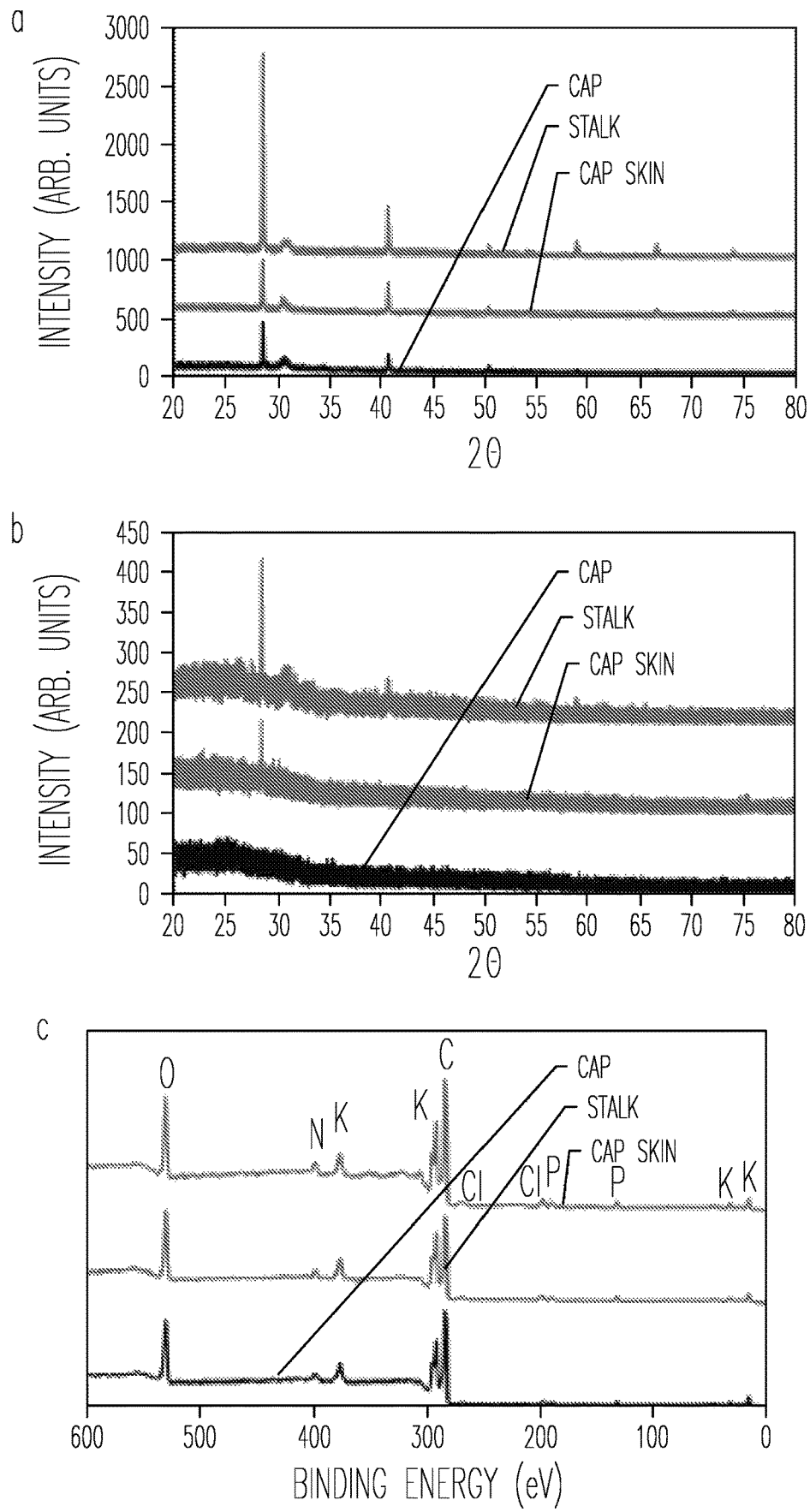
FIG. 5 shows XPS spectral data from CT (Cap), ST (Stalk) and CST (Cap Skin), including XRD before DI $H_2O$ wash (a), after DI $H_2O$ wash (b), and XPS of pristine, unwashed samples (c), according to an example of the invention.

Spectral data was obtained for the three carbonized tissues, including X-ray diffraction (XRD) and X-ray photoelectron spectroscopy (XPS), to analyse phases present in the as-prepared carbonized samples. Pristine samples of the CT, ST, and CST were prepared by carbonizing slices of each tissue at a thickness of approximately 3-4 mm, resulting in carbonized disk-shaped samples of about 1-3 mm in thickness. The strong peaks observed in FIGS. 5a at 2θ: 28.5, 40.6, 51.0, 58.8, 66.5, and 74.0 correlate to the diffraction angles of cubic crystalline KCl. The less intense, rounder peak at 2θ: 31.3, however, is characteristic of the primary peak of NaCl. Therefore, the XRD spectrum for the pristine, unwashed samples detect principally metal halide salts, due to the homogeneity of their crystals compared to phosphorus-containing compounds. Finally, the slightly elevated downfield region (between 2θ: 20 and 35) correlate to amorphous carbon. The XRD spectrum of post-DI $H_2O$ washed samples is shown in FIG. 5b, where it is shown that the halide salt presence is significantly reduced. There is still a noticeable presence of KCl and NaCl in the samples, although the intensity diminished by a large factor, which agrees well with the post-wash EDS of the CT. The elevated downfield region associated with amorphous carbon is also more prominent in the post-wash XRD analysis. Overall, the order of strongest halide salt signals from largest to smallest is the ST, CST, and CT, respectively. For the post-wash XRD CT sample, the salt peaks are almost entirely absent. The common elements present in the carbonized PM tissue samples were confirmed using XPS analysis. Samples used for XPS were pristine and unwashed. For each sample type, the signature peaks for C, O, K, P, Cl, and N were prominent. The strength of each peak showed no significant change between tissue types. The strong presence of K observed in all forms of analysis in this study are expected, and is not attributed to contamination of the specimen before purchasing.

The examination of Portobello mushroom (PM) sections from the cap tissue (CT), stalk tissue (ST) and cap skin tissue (CST) was carried out after carbonization at 600° C. for 5 hours. The resulting architectures at the micro-scale lead to new insights which are compelling for future biomimetic and/or bio-inspired materials engineering endeavours. The carbonization of the chitin-containing PM biomass resulted in microstructures of the following types: CT resembles a randomly-oriented, cavernous, thicker-walled carbon foam structure, ST assumes a unidirectional, elongated sinter column-like structure, and CST assumes an interconnected carbon nanoribbon structure. The elemental compositions of each section were analysed through EDS, XRD and XPS. Results indicate that the as-synthesized samples have, in addition to carbon and oxygen, a significantly high concentration of potassium, phosphorus, chlorides, among other trace minerals.

Here we explore the electrochemical performance of pyrolyzed skins from the species *A. bisporus*, also known as the Portobello mushroom, as free-standing, binder-free, and current collector-free Li-ion battery anodes. At temperatures above 900° C., the biomass-derived carbon nanoribbon-like architectures undergo unique processes to become hierarchically porous. During heat-treatment, the oxygen and heteroatom-rich organics and potassium compounds naturally present in the mushroom skins play a mutual role in creating inner void spaces throughout the resulting carbon nanoribbons, which is a process analogous to KOH-activation of carbon materials seen in literature. The pores formed in the pyrolytic carbon nanoribbons range in size from sub-nanometer to tens of nanometers, making the nanoribbons micro, meso, and macroporous. Detailed studies were conducted on the carbon nanoribbons using SEM and TEM to study morphology, as well as XRD and EDS to study composition. The self-supporting nanoribbon anodes demonstrate significant capacity increase as they undergo additional charge/discharge cycles. After a pyrolysis temperature of 1100° C., the pristine anodes achieve over 260 mAh/g after 700 cycles and a Coulombic efficiency of 101.1%, without the use of harmful solvents or chemical activation agents.

Carbon materials are of great importance to a range of battery chemistries. Carbon is the most versatile element on the periodic table, and its various allotropes make for highly diverse properties and applications. In Li-ion batteries, carbon has been studied for decades. The current industry standard for rechargeable Li-ion battery anodes is synthetic graphite. While graphite has commercially desirable attributes, such as a high cycling stability and low hysteresis, it comes with its own trade-offs. The disadvantages of graphite are that it is relatively expensive to make and has a relatively low lithium storage capacity per carbon weight ($LiC_6$). Alternatives to graphitic carbons for Li-ion anodes are hard carbons and soft carbons, which can be synthesized in a number of ways. A traditional form of hard carbon synthesis involves the pyrolysis of sucrose, a natural organic sugar. Studies show that hard carbon anodes yield higher specific capacities than graphitic structures (over 500 mAh/g). However, they tend to have significant irreversible capacity, owing to lithium's reactivity with both the electrolyte and the surface functional groups of the carbon structure which form after pyrolysis. In terms of commercializing new forms of carbon for Li-ion batteries, naturally-derived carbon precursors must be explored. Activated carbons are also showing incredible promise for implementation as scalable, commercially-viable Li-ion anodes. Activated carbons are most commonly produced from exposure to a concentrated KOH solution, or other chemical activating agents. KOH treatment generates additional mesopores and/or micropores after thermal activation; the resulting defects encourage higher capacities by allowing additional lithium insertion into the carbon. A traditional method for activating carbon involves submersion in a KOH bath, followed by a high-temperature heat-treatment. For KOH activation, two modes of action are thought to be at play for pore generation, such as reaction of carbon with metallic K, as well as CO and $CO_2$ formation. The efficacy of coffee shell-derived activated carbon has been explored as a Li-ion anode, which was activated using KOH and an array of other activating agents. This process produced an anode with a nearly 300 mAh/g reversible capacity over 15 cycles, with an impressive initial capacity of over 1100 mAh/g. There are several nuances to characterizing high-performance biomass-derived carbon anodes for Li-ion batteries, due to their complex organic compositions. Biomass-derived electrode materials are of great interest because of their high carbon content, low cost, and environmental benignity.

Figure 6:
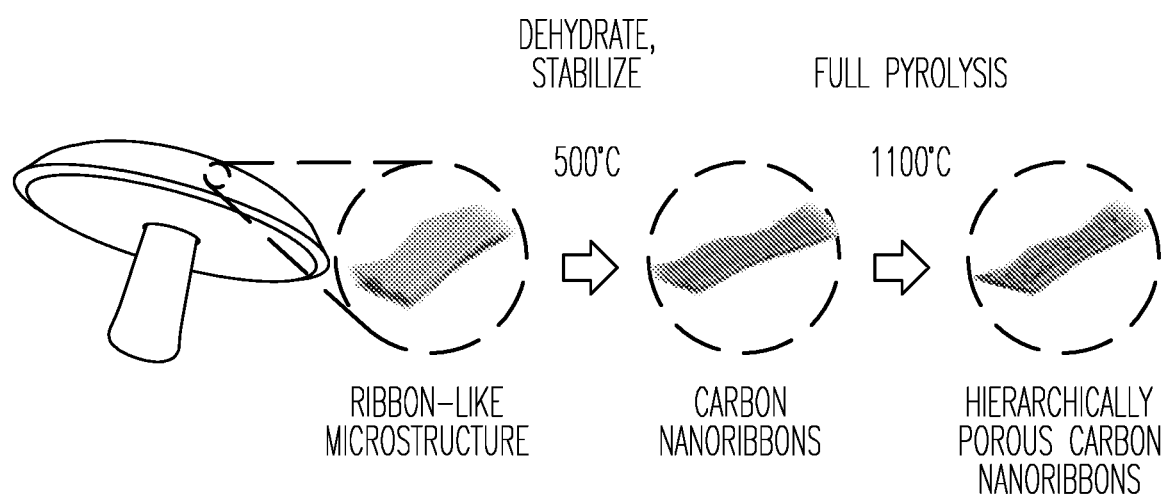
FIG. 6 shows a schematic illustration of the process of obtaining Portobello mushroom skin-derived, hierarchically porous carbon nanoribbons used as free-standing, binder-free, current collector-free carbon anodes, according to an example of the invention.

In the present disclosure, we discuss the electrochemical performance of pyrolytic carbons derived from the cap skin tissue (CST) of the mature fruiting body of the fungus, *A. bisporus*, otherwise known as the Portobello mushroom (PM). Our studies of the PM CSTs have revealed compelling microstructural features after anoxic carbonization. Specifically, we discovered that the pyrolyzed PM CST formed high aspect-ratio carbon nanoribbons. Additionally, we confirmed remarkably high concentrations of salts after carbonization, primarily KCl. Further, PM CSTs were examined after various pyrolysis temperatures (PTs) to compare microstructural and compositional changes with corresponding electrochemical behaviour. The purpose of this method is to observe the true performance of bio-derived structures as battery electrodes (i.e., without binder, conductive additive, etc.), and to examine the characteristics of the resulting pristine carbon. To this end, the PM CST anodes were placed in a Li-ion battery half-cell configuration, completely as-synthesized. In further SEM studies, the PM CSTs manifested hierarchical porosity after PT above 900° C., showing macro, meso, and micropores, as illustrated in the schematic in FIG. 6. This raised an interesting possibility with this unique material; PM CSTs may, due to their unusually high K concentration, be self-activating. However, synthetic processes need to be optimized to expose the microchannels or worm-like micropores formed during pyrolysis, and thereby increase the measurable surface area. These novel PM CST anodes are binder-free, requiring zero polymers or conductive additives, to attain capacities that are comparable to practical graphite-based electrodes. Binder-free Li-ion electrodes are far superior to graphite-based electrodes, due to their higher utilization of total electrode weight as active material, and minimal processing. In turn, this translates to batteries with higher energy density, lower cost, and lower environmental impact.

Results

Figure 7:
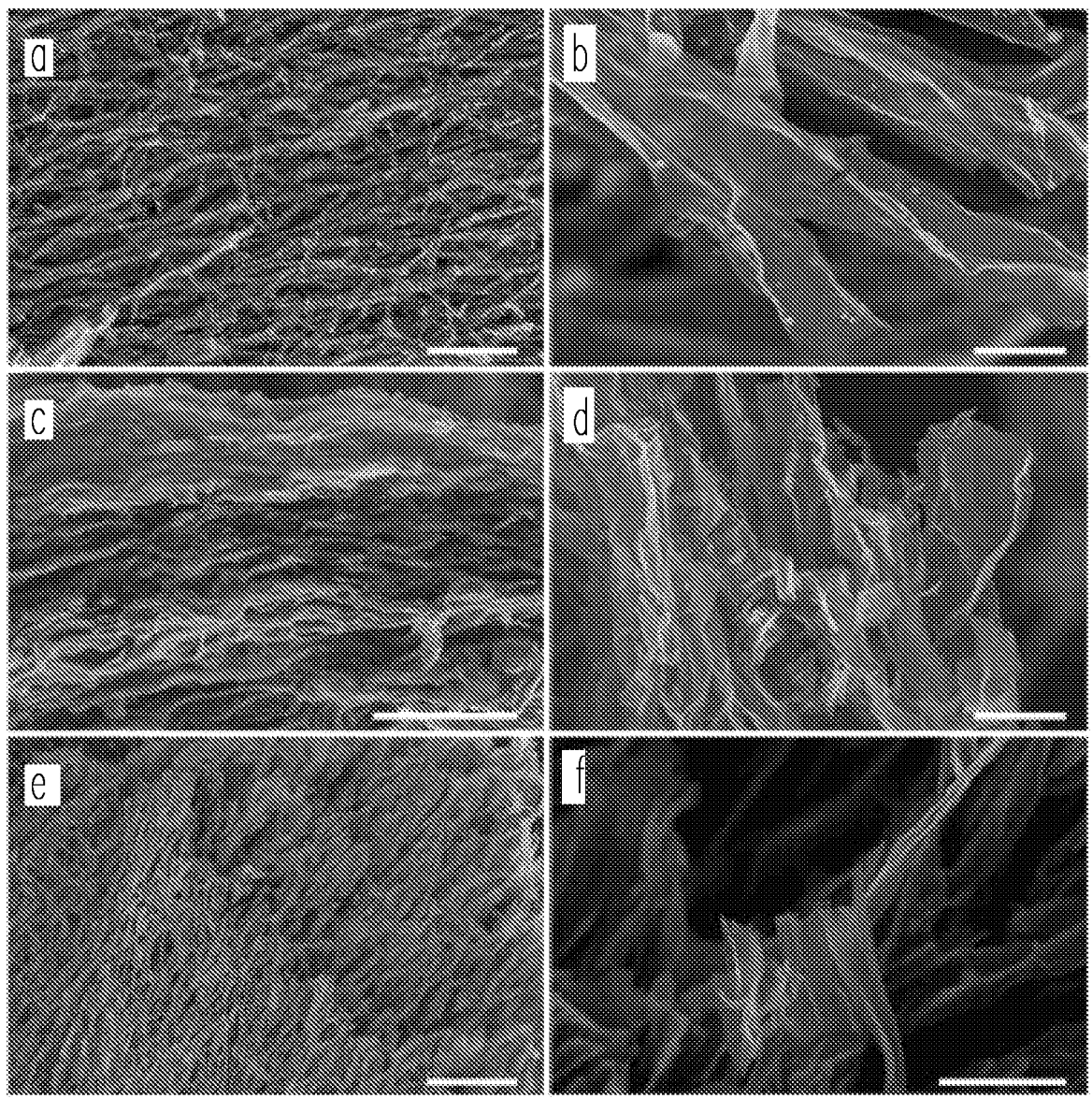
FIG. 7 shows low to high magnification SEM of PM CST anodes heat-treated at 700° C. (a,b), 900° C. (c,d), and 1100° C. (e,f) (Scale bars for a-f, respectively: 100 µm, 10 µm, 50 µm, 10 µm, 100 µm, and 10 µm), according to an example of the invention.

Structural characterization was conducted on the PM CSTs using SEM, observing pyrolysis-induced morphological transformations at the micro- and nanoscale. From the micrographs in FIG. 7, it can be seen that the common microstructural feature is nanoribbons, with a sometimes wrinkled appearance.

They make up an extremely thin, secondary electron-transparent array of interconnected, branching ribbons with widths of about 10 µm, lengths of several tens of microns or longer, and a thickness of about 20-100 nm. A key structural difference making 700CSTs (FIG. 7*a-b*) distinct from 900CSTs (FIG. 7*c-d*) and 1100CSTs (FIG. 7*e-f*) is the presence of round salt pockets. These salt pockets are thought to form during heating, as water escapes and naturally-present biological salts aggregate, both within the chitin-based organics, and on the surface. At temperatures above 900° C., these salt pockets disappear, having exceeded the melting points of most salts present. It should also be noted that, especially in FIG. 7*a* and *e*, the nanoribbons form a network. There is also layering and/or pseudo-layering, as evidenced in FIG. 7*c*, which shows a lateral view of the layered ribbon networks.

Figure 8:
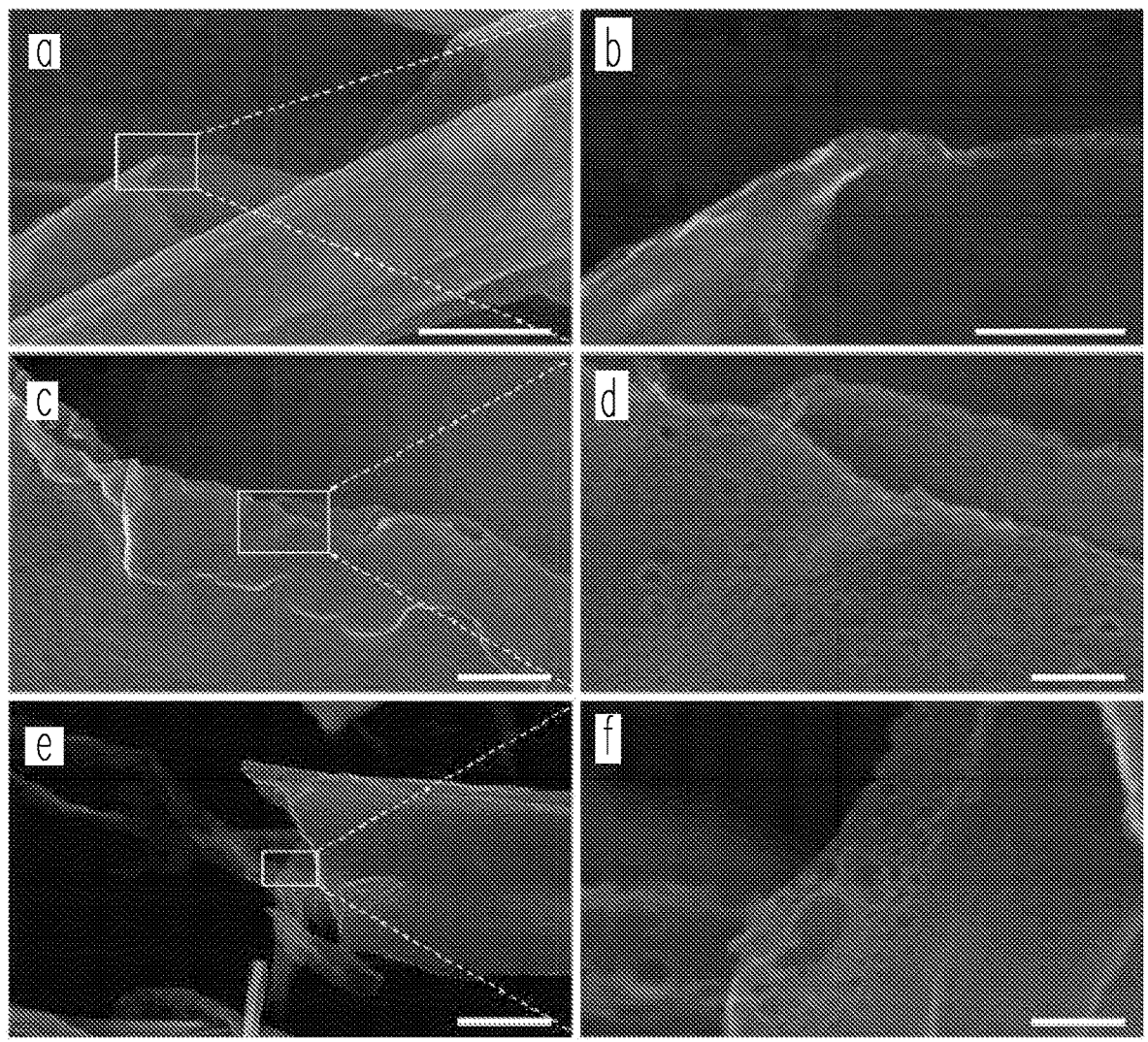
FIG. 8 shows low to high magnification SEM showing the increasing degree of porosity of PM CST nanoribbons as temperature increases, including sample heat-treated at 700° C. (a,b), 900° C. (c,d), and 1100° C. (e,f) (Scale bars for a-f, respectively: 1 µm, 200 nm, 500 nm, 100 nm, 1 µm, and 100 nm), according to an example of the invention.

Observations were also made on higher-magnification SEM micrographs of the various PM CSTs. As mentioned, biological salts (primarily KCl) organize in pockets of varying sizes, and begin to create additional void space at 700° C. However, the melting point of KCl is 770° C., and above this temperature the salts escape the carbon structure more completely. As captured in FIG. 8*a* and *b*, salt deposits are still present at the surface of the nanoribbons, having a wide diameter distribution (although some pores are still formed). Beginning in FIG. 8c and d, no surface salts or salt pockets are present, and instead there is a hierarchically porous texture. Pores observable from SEM have diameters between 26 nm or higher, down to an observable 6 nm, which is the lowest feature size observable from the SEM images. From this data, it is confirmed that this material becomes mesoporous upon pyrolysis, with pore sizes of 6-26 nm observable by SEM. Images in FIG. 8e and f, representing the 1100CSTs, display an even wider range of porosity than the 900CSTs, with macropores of up to 100 nm in diameter. To confirm that porosity exists throughout the bulk of the nanoribbons, rather than solely on the surface, cross-sections of the nanoribbons were captured under SEM, shown in FIG. 8d and f. In these images, the presence of pores is evident throughout the entire thickness of the nanoribbons.

Figure 9:
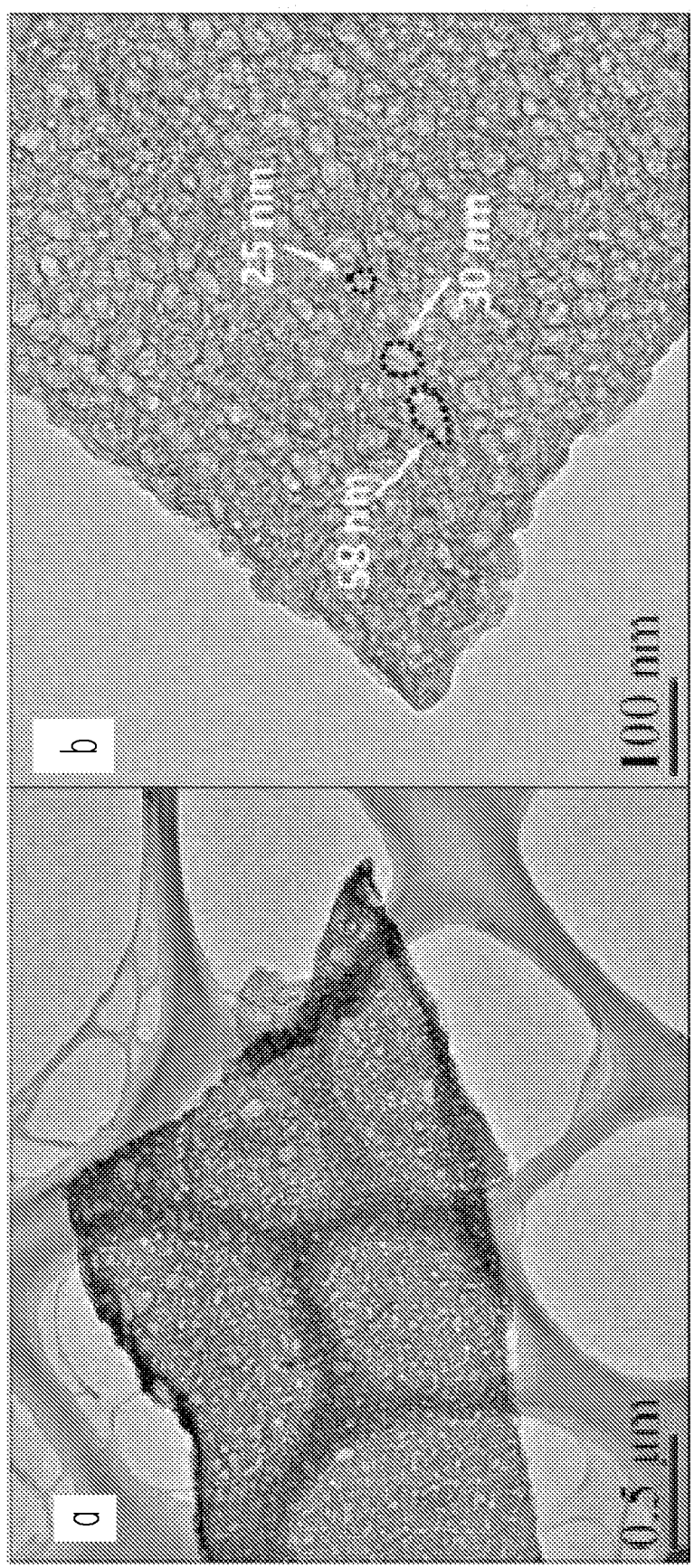
FIG. 9 shows TEM of pristine PM CST hierarchically porous nanoribbons, showing macroporosity (a-b), mesoporosity (c-d) and worm-like microporosity (e-f), according to an example of the invention.
Figure 9:
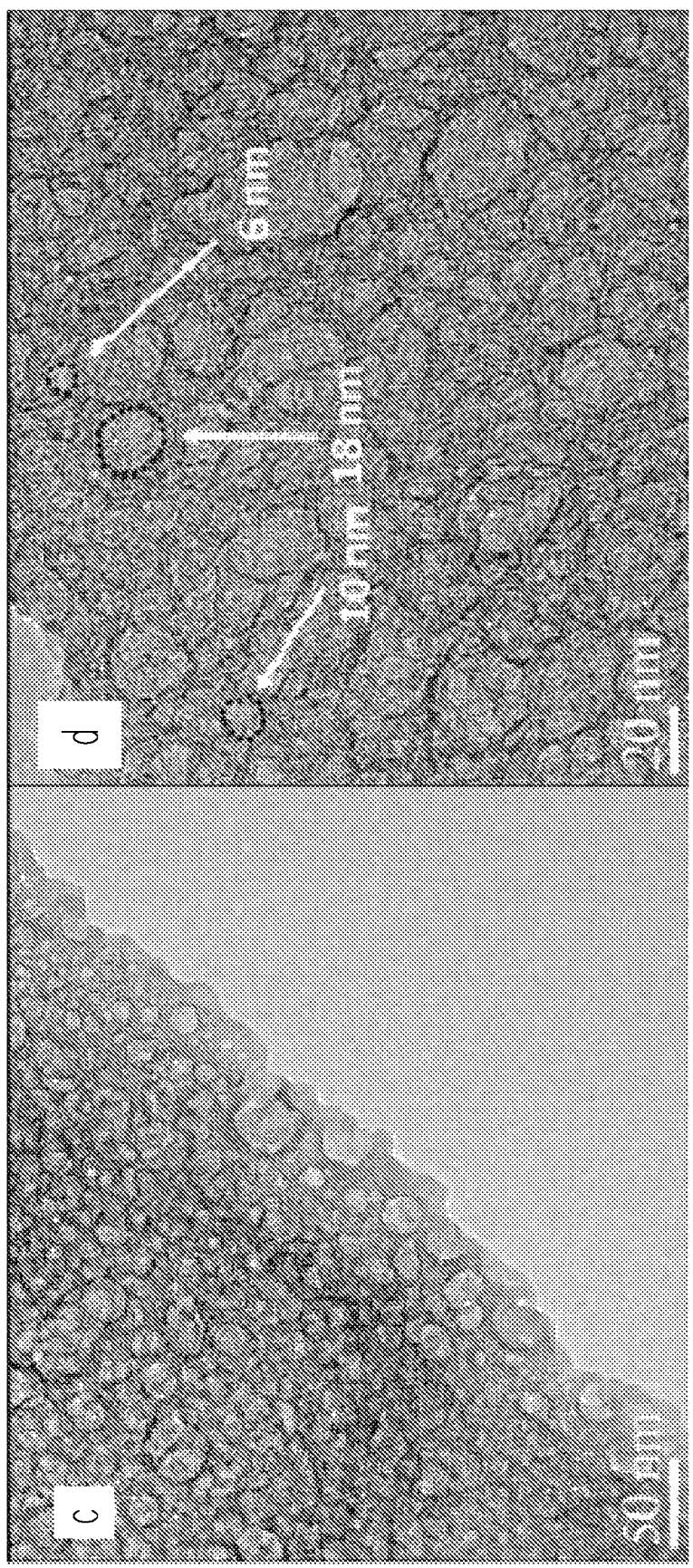
Figure 9:
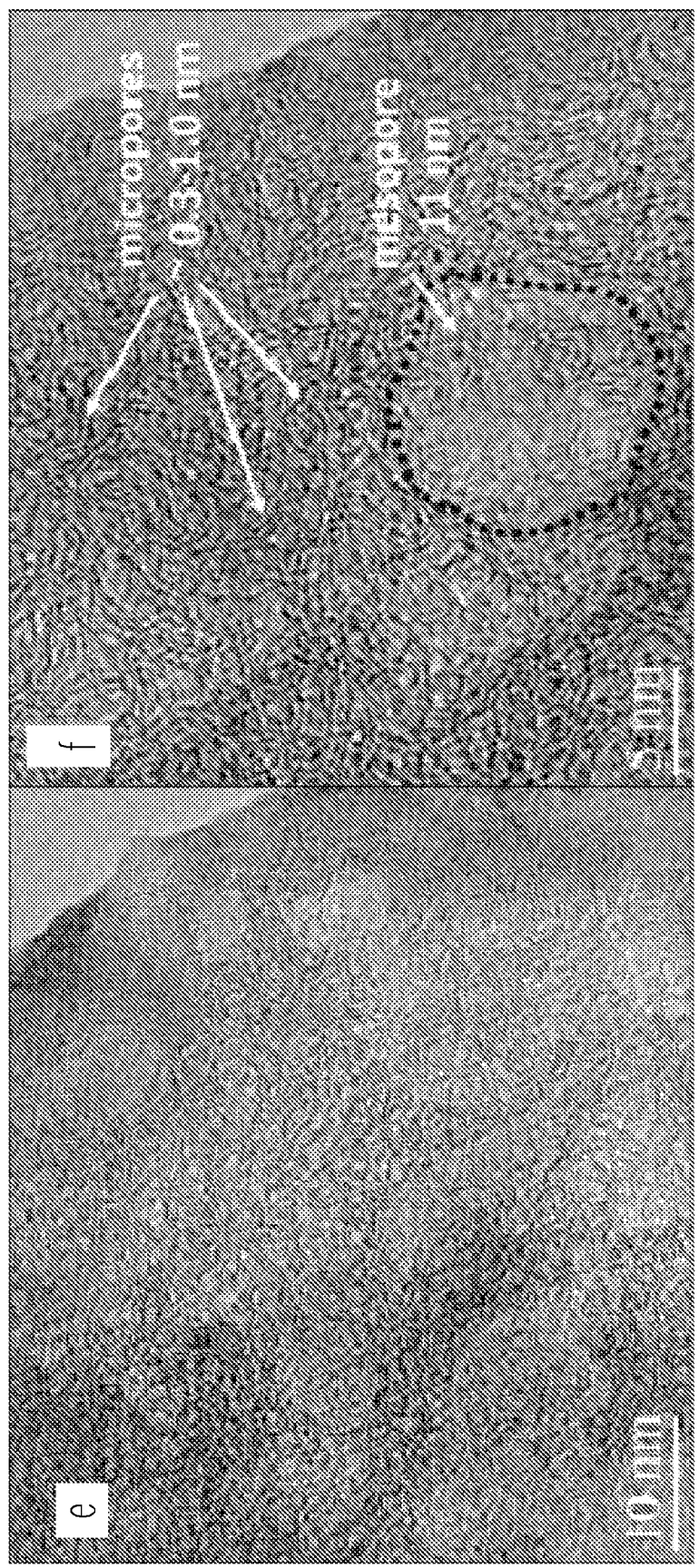

Detailed transmission electron microscopy (TEM) analysis was also conducted on the 1100CSTs, since they were both the highest performing anode material, and displayed the highest apparent porosity from SEM. The microstructure seen in the lower-magnification images (FIG. 9a-b) is consistent with what is seen in SEM, which is a thin, highly mesoporous nanoribbon architecture. The range of pore size is confirmed from FIG. 9b, d and f, identifying macropores and mesopores. Remarkably, TEM analysis also confirms the presence of worm or channel-shaped micropores, as observed in FIG. 9f. The low thickness of the ribbon is observed from the transparency of the structure in FIG. 9a, wherein the lacey carbon from the TEM grid is visible from beneath the sample. The general shape of the meso- and macropores of the nanoribbons is circular, information which supports the idea that salt pocket formation, and subsequent melting induces this type of void space generation. On the other hand, it is hypothesized that the worm-like micropores captured in FIG. 9f are generated through an activation-like process. $N_2$ adsorption/desorption isotherms show a long, flat plateau for adsorption and desorption, and a significant hysteresis (a characteristic of mesoporous and/or microporous carbons). The BET surface area was measured at 19.6 $m^2/g$, which is a discrepancy in relation to the isotherm and TEM data; this points the prevalence of "blind," or inaccessible pores formed in the 1100CSTs, which then become accessed after deep cycling Moreover, our leading hypothesis is that oxygenated organics (polysaccharides, oligosaccharides, amino acids, DNA), combined with the unusually high K concentration, may lead to carbonate formation, and subsequent $CO_2$ generation; this is that basis of chemical activation, or a similar mechanism.

The phenomenon of small, biological salt pockets causing void spaces of various sizes, from the macroporous to microporous domains, leads us to propose that high PT-pyrolyzed PM CSTs are inherently a self-activating material, by a complex set of mechanisms. It is highly advantageous to have a material that can be naturally primed for optimal performance by simply applying heat-treatment. At PT of 1100° C., macropores form, facilitating electrolyte infiltration and hence electrolyte interaction with high surface-area hard carbon (shown to be higher capacity than graphite, gravimetrically). Mesoporous carbons have been shown to perform with excellent stability over long-cycling in literature, however, harsh chemical methods are required to achieve such performance. Hierarchically porous carbons, also achieved by many activation methods, tend to improve ion diffusion rates, and expose additional active material for reversible capacity enhancement.

Spectral data was obtained from the PM CSTs after PTs of 700-1100° C. to analyze elemental composition by point-ID energy dispersive x-ray spectroscopy (EDS), and phase information using x-ray diffractometry (XRD) of the free-standing anodes. From FIG. 10a, XRD patterns show the transition from large KCl peaks for the 700CSTs (blue), to the 1100CSTs (black) with no visible peaks of crystalline inorganics. The prevailing model for KOH-activation is shown in Eqn. (1) and (2). At temperatures above 400° C. Eqn. (1) occurs, and above 700° C. Eqn. (2) occurs (gasification of $CO_2$ occurs throughout this process). Further, $K_2O$ from Eqn. (2) continues to be reduced by carbon to metallic K at above 700° C. A physical means of activation then occurs, when metallic K diffuses into carbon, expanding the lattice. Considering the classical chemical and physical models for KOH-activation, it is likely that the biological salts present in the PM provide suitable precursors for similar activation mechanisms. With salt deposits of various sizes composed of KCl, and likely a host of carbonates and phosphates, the PM is an ideal self-activating carbon precursor for PTs above 900° C.

$$6KOH + 2C \rightarrow 2K + 3H + 2K_2CO_3 \qquad (1)$$

$$K_2CO_3 \rightarrow K_2O + CO_2 \qquad (2)$$

Figure 10:
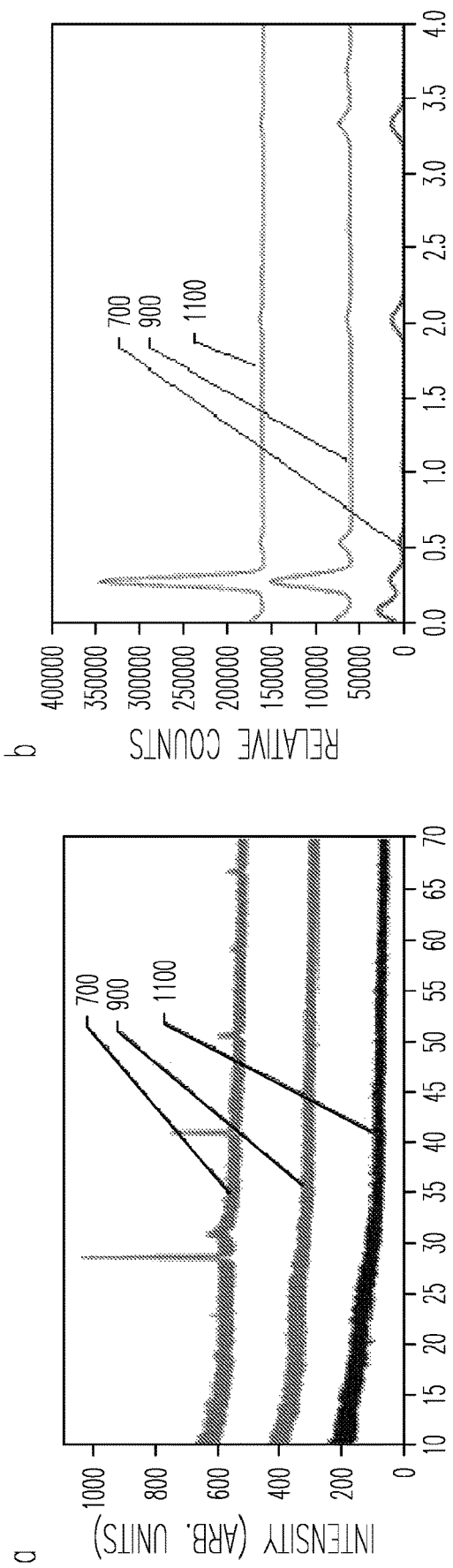
FIG. 10 shows spectral data of the pristine, free-standing PM CSTs at various PTs, including XRD (a) and point-ID EDS (b), according to an example of the invention.

The EDS spectrum is included in FIG. 10b, which clearly shows the diminishing metal salts as the PT increases from 700-1100° C. The free-standing electrodes which result from pyrolysis are used as-synthesized for electrochemical characterization. Naturally, as the wt. % of heteroatoms and inorganic material is reduced in the electrodes, the specific cycling capacity increases. Although EDS results vary slightly from sample to sample (since no two biological specimens are compositionally precisely the same), an average of ~50 wt. % carbon was found in 700CSTs, ~70 wt. % carbon in 900CSTs, and ~90 wt. % carbon in 1100CSTs. While a main mode of oxygen reduction is through gasification and formation of $CO_2$, an additional mode is thought to be the melting of inorganics and salts. To observe any differences in battery performance on the carbon anodes due to surface functionalization, some 1100CSTs were submerged in a KOH bath for several hours at 80° C. before electrochemical characterization, and denoted as "KOH1100CST."

Discussion

The specific capacity increase from 700CSTs to 1100CSTs is both due to carbon purification from high PT, and from the proposed natural self-activation, allowing for increased electrolyte infiltration and utilization of active mass. The specific capacities of each sample increases over time, suggesting that the initially unexposed meso- and micropores become more accessible after repeated cycling. It should be specifically noted that the capacity of the 1100CSTs and KOH1100CSTs begin to converge near the $270^{th}$ cycle. The large difference in discharge capacity between 1100CSTs and KOH1100CSTs from cycle number 1 and 60 may be attributed to initial improved wetting from surface functionalization with hydroxyl and/or carboxyl functional groups. In the long-term, the full capacity may not be significantly affected by these surface groups; in fact, after 500 cycles the non-KOH-wetted 1100CSTs achieve significantly higher capacity at a higher rate. While all four PM CSTs exhibit a very gradual increase in capacity over time, the 1100CSTs maintain the steepest incline.

Figure 11:
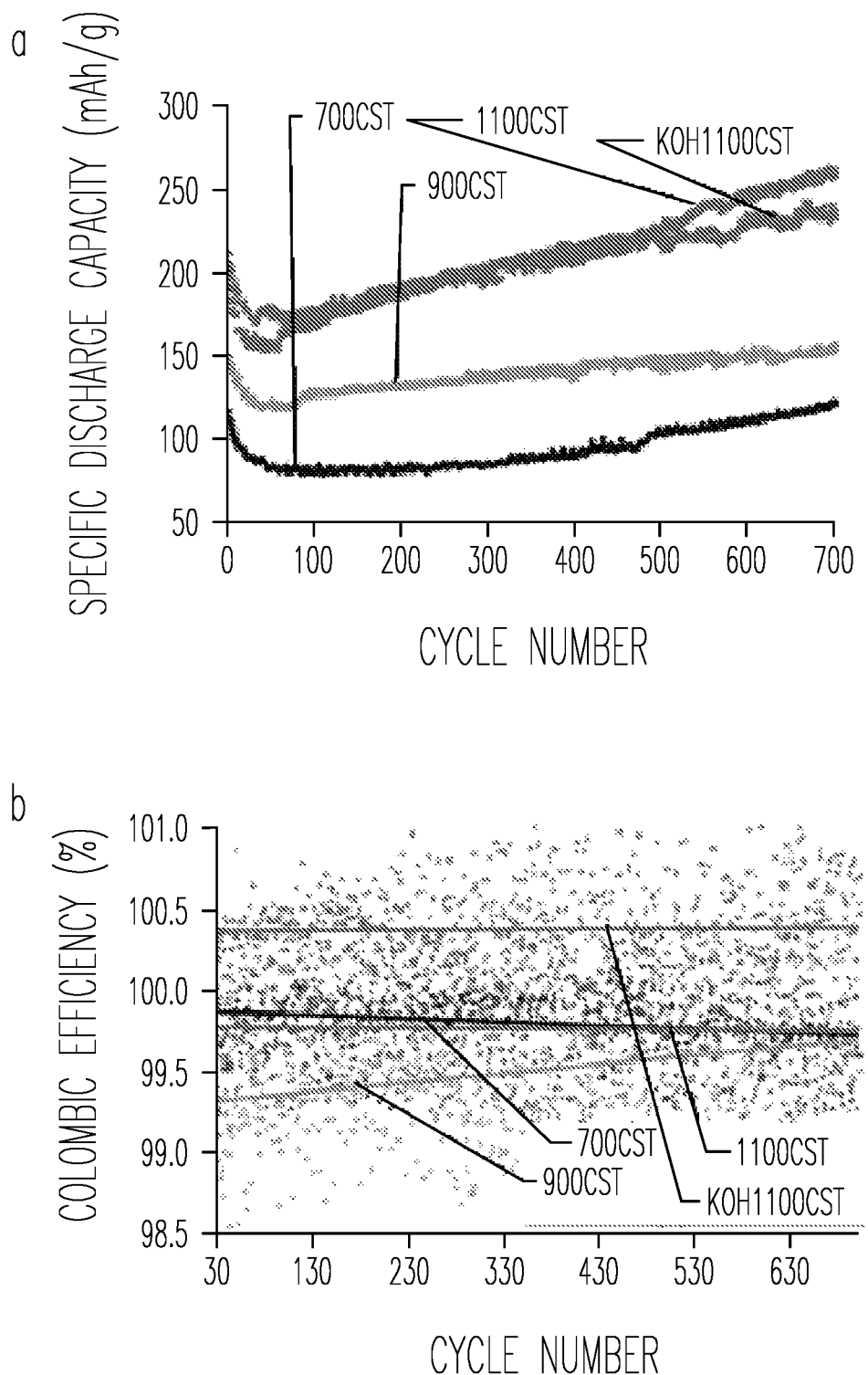
FIGS. 11A-F shows Electrochemical performance data of PM CSTs, including charge/discharge plots (a), Coulombic efficiency plots (b), and CV curves from cycles 1-11 for 700CST (c), 900CST (d), 1100CST (e), and KOH1100CST (f), ccording to an example of the invention.
FIG. 11G shows a cyclability plot of Portobello mushroom cap skin tissue (CST) carbon anodes, showing specific charge capacity, discharge capacity, and Coulombic Efficiency, according to an example of the invention.
Figure 11:
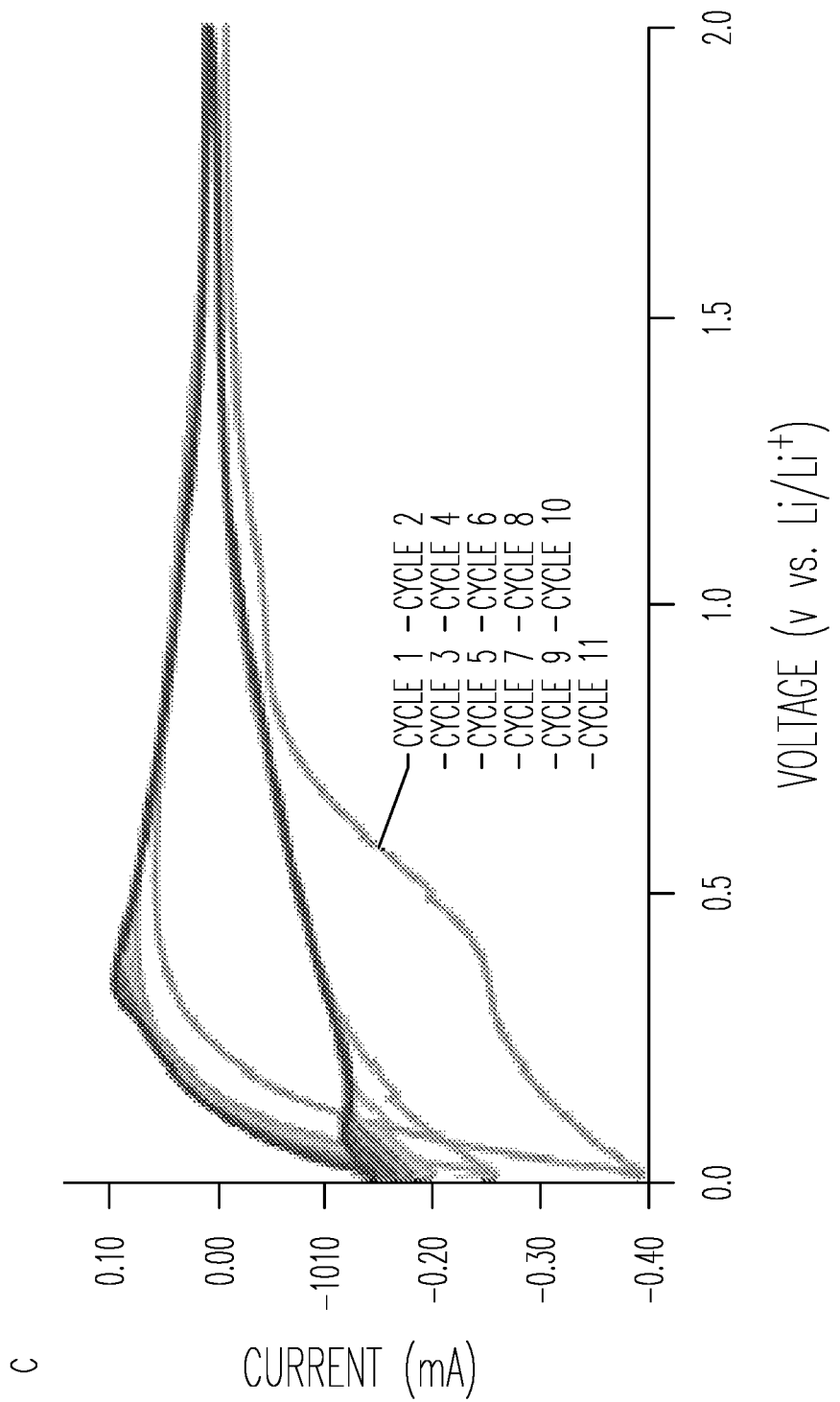
Figure 11:
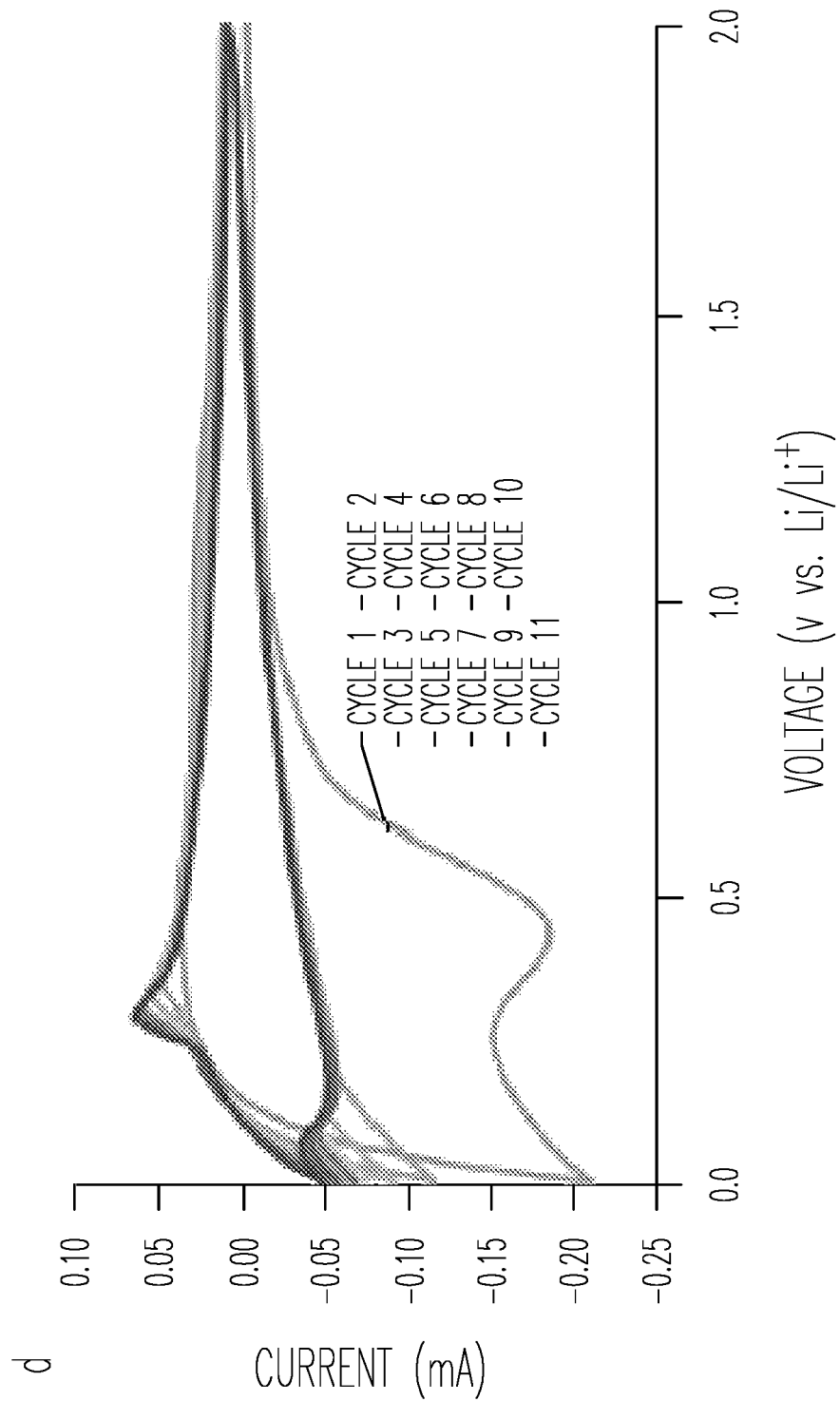
Figure 11:
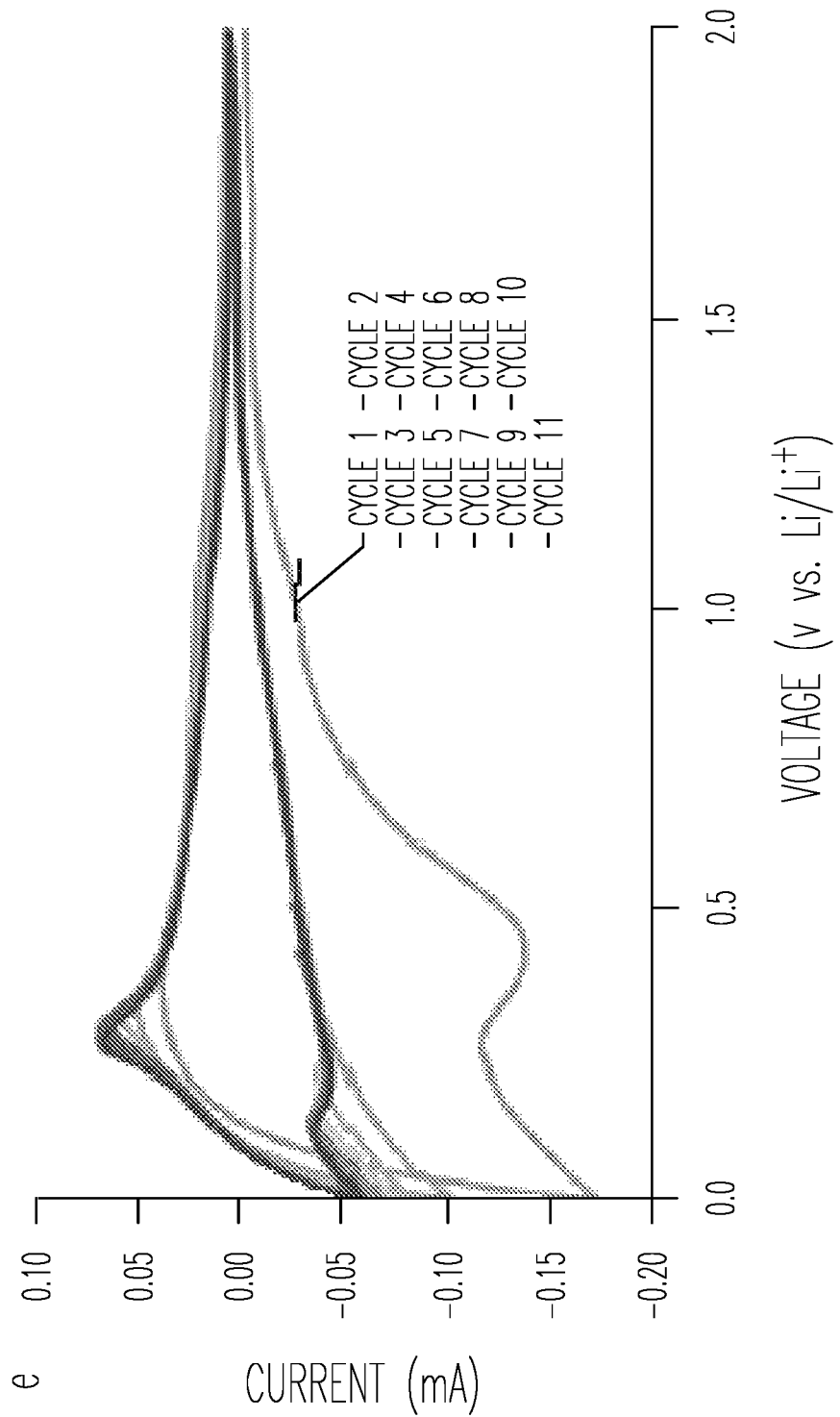
Figure 11:
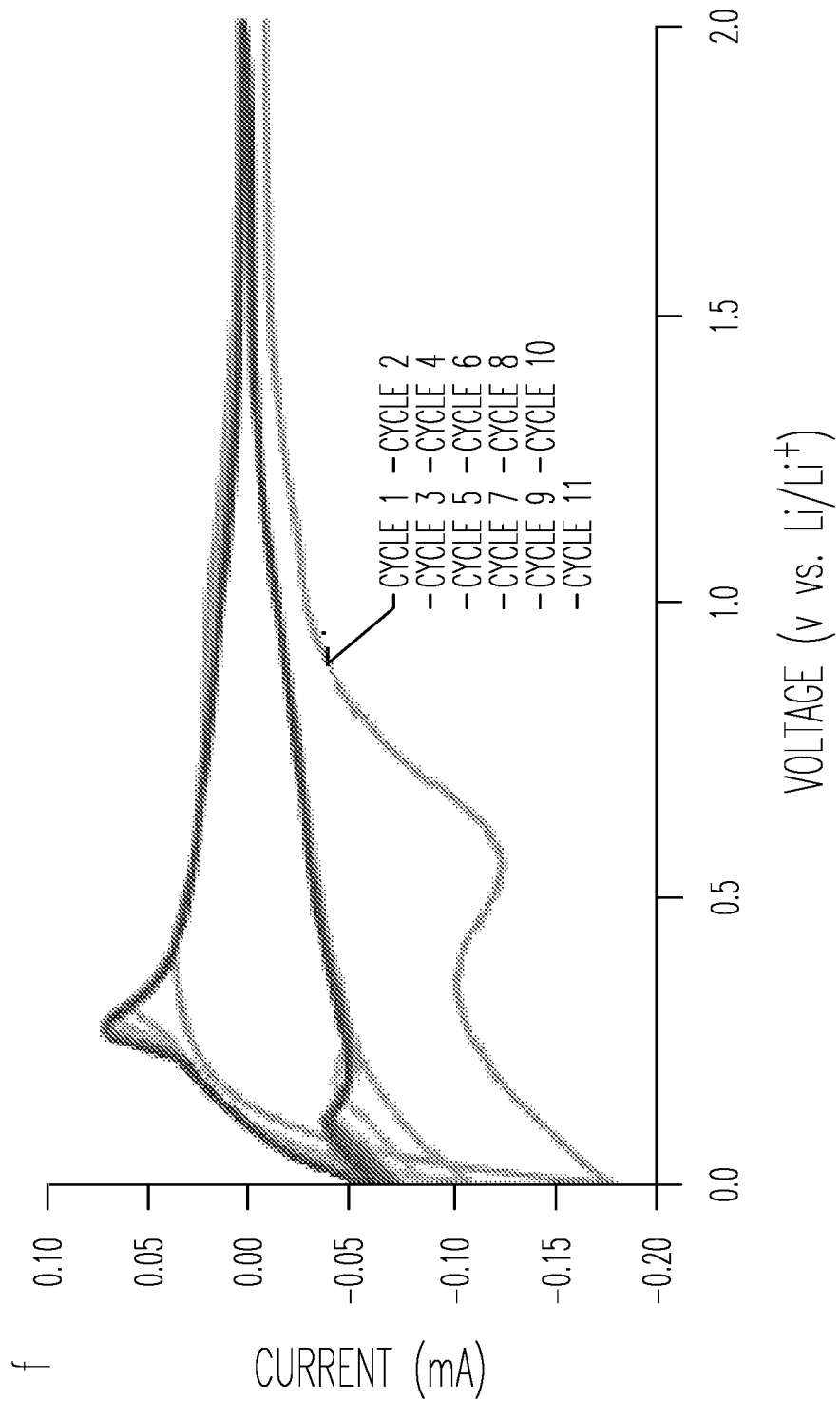
Figure 11:
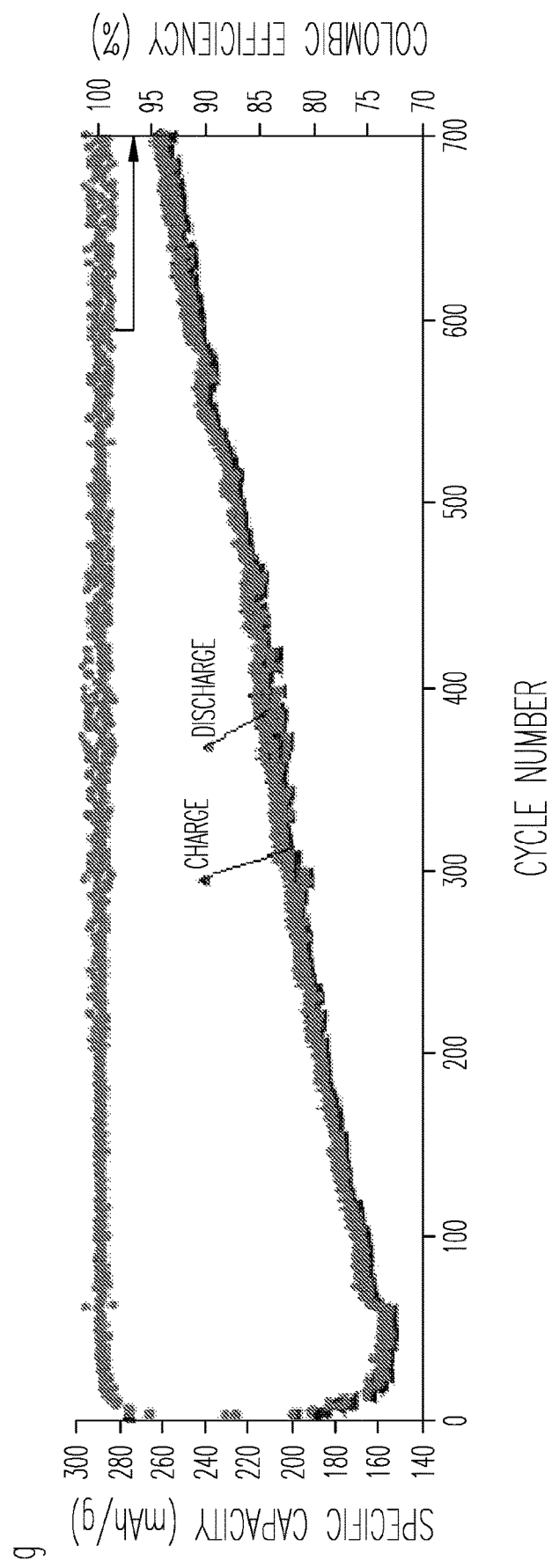

As previously explained, there are likely multiple modes of action by which this hard carbon-like material becomes activated. A complex mixture of salts, including KCl, NaCl, and likely phosphates, coupled with organics their respective heteroatoms, is undergoing reactions above 700° C. that induce CO₂ gasification, as well as metallic K diffusion and carbon lattice expansion. Most interestingly, the more pronounced capacity incline of the 1100CSTs and KOH1100CSTs strongly indicates that the micropores are becoming more accessible to the electrolyte with each subsequent oxidation/reduction reaction of the anode (reactions which initially are taking place at the electrode surface). As the micropores become more accessible to the electrolyte, the effective specific active mass increases, therefore increasing the specific capacity over time. FIG. 11a shows that by the $700^{th}$ cycle, 700CSTs, 900CSTs, 1100CSTs, and KOH1100CSTs exhibit 121.6 mAh/g, 157.5 mAh/g, 233.8 mAh/g, and 260.1 mAh/g, respectively. Therefore, a capacity increase of over 138 mAh/g from PT 700-1100° C. is achieved for the free-standing carbon anodes, with the 1100CSTs outperforming the KOH1100CSTs for more than half the current life of the battery. If calculated based on the approximate wt. % of carbon in the 1100CST cathode, the specific discharge capacity is 289 mAh/g, which is expected to increase to beyond 300 mAh/g at its current rate of capacity increase. The first discharge/charge cycle for this experiment was run at a rate of C/10, while all subsequent cycles were run at C/5, based on a theoretical 500 mAh/g. The initial discharge capacity (out of range for FIG. 11a and 11g) for 700CSTs, 900CSTs, 1100CSTs, and KOH1100CSTs are 429.6 mAh/g, 617.8 mAh/g, 771.3 mAh/g, and 630.9 mAh/g, respectively. A relatively large irreversible initial capacity loss is exhibited for each of the PM CSTs, which is highly characteristic of hard carbon structures.

The Coulombic efficiency (CE) plots of all PM CSTs are shown in FIG. 11b, including the KOH1100CSTs (linear trend lines shown in their respective colors for distinction). Contrary to what was expected, the 700CSTs actually demonstrated the $2^{nd}$ highest overall CE, achieving higher than both the 1100CSTs and 900CSTs. The higher CE in 700CSTs may explained in two parts: a) the samples, with the exception of the KOH1100CSTs, were unwashed before placing in coin cells, and b) the electrolyte has relatively low access to the carbon-protected salts that are, below 900° C., still trapped in pockets. Since the 900CSTs and 1100CSTs have exposed the majority of the salts, and were also unwashed, the CE may be adversely affected by the electrolyte interaction with any residual salts. Overall, the average CE between cycles 30 and 700 for 700CSTs, 900CSTs, 1100CSTs, and KOH1100CSTs are 99.79, 99.51, 99.75 and 100.37%, respectively.

Cyclic voltammetry (CV) was performed on the PM CSTs at PTs from 700-1100° C., including the KOH1100CSTs, for 11 cycles. The scanning rate used for all CV measurements was 0.1 mV/s. For each of the curves in FIGS. 11c-f, the peak in the initial cycle at ~0.5 V is indicative of the solid-electrolyte interphase (SEI) layer formation. This reaction stabilizes relatively quickly with the $2^{nd}$ cycle and subsequent cycles at around 0.2 V. The 700CST shows a less pronounced SEI formation peak compared to the higher PT samples, which corresponds well with the smaller irreversible capacity loss from the $1^{st}$ cycle. During charging, each PM CST exhibits a delithiation peak for cycles 2-11 at about 0.3 V. This peak is much more pronounced after PTs above 900° C.; the current increases with each subsequent cycle.

Figure 12A:
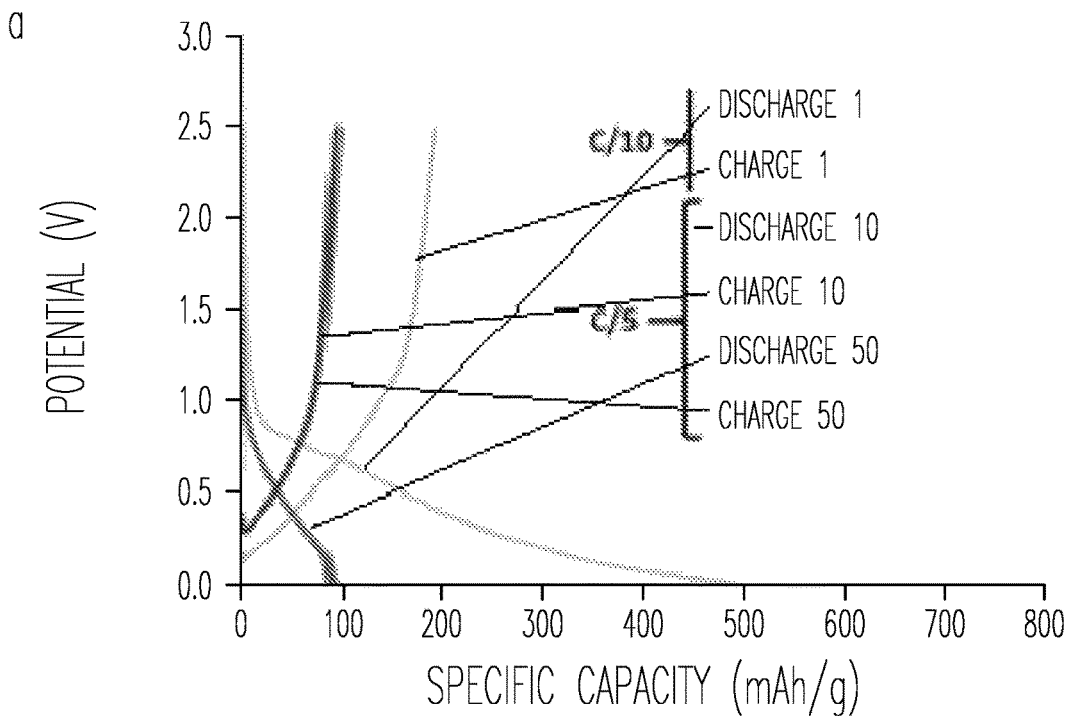
FIG. 12A shows Voltage profiles of cycles 1, 10 and 50, for PM CSTs, including 700CST (a), 900CST (b), 1100CST (c), and KOH1100CST (d), according to an example of the invention.
Figure 12A:
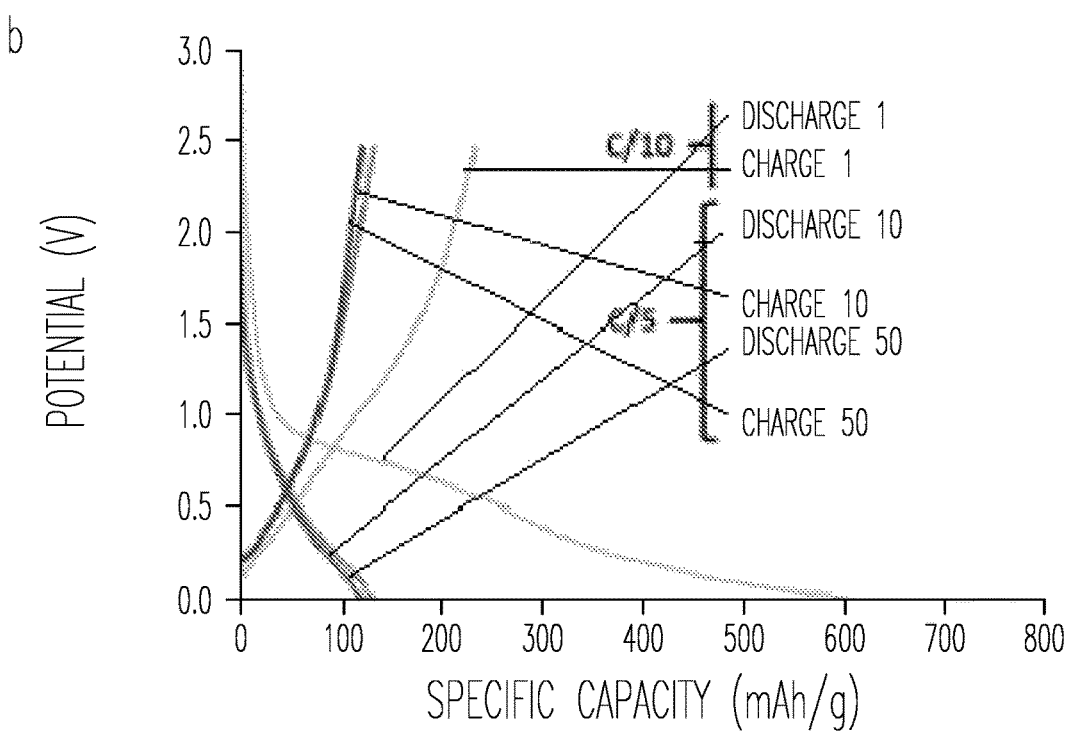
Figure 12A:
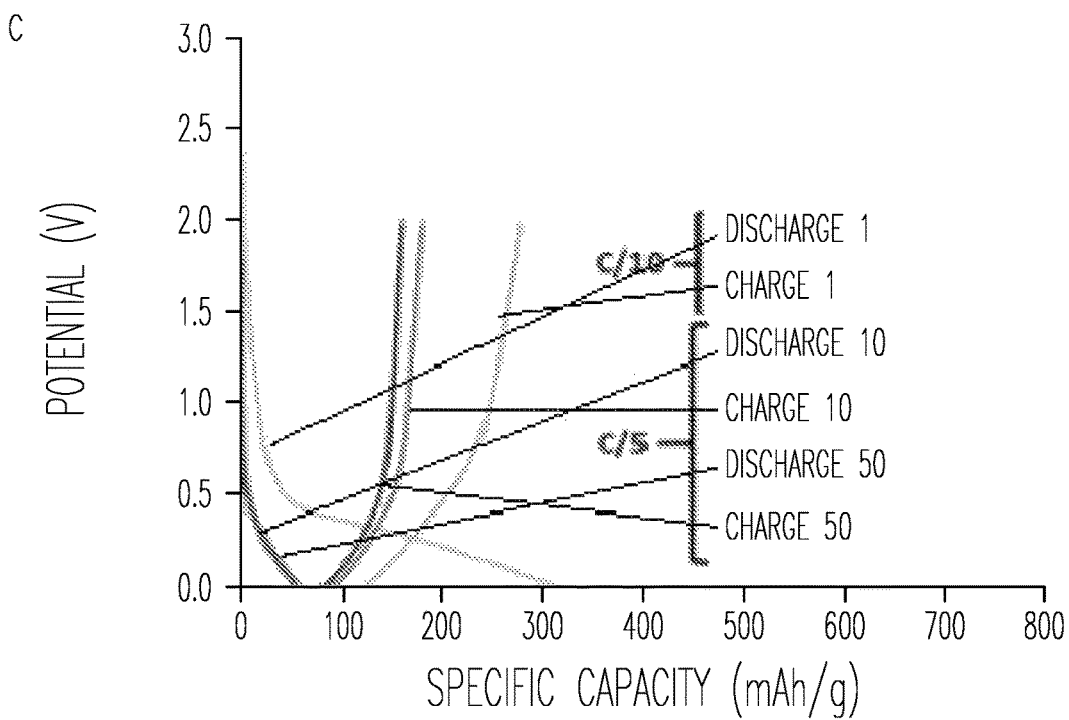
Figure 12A:
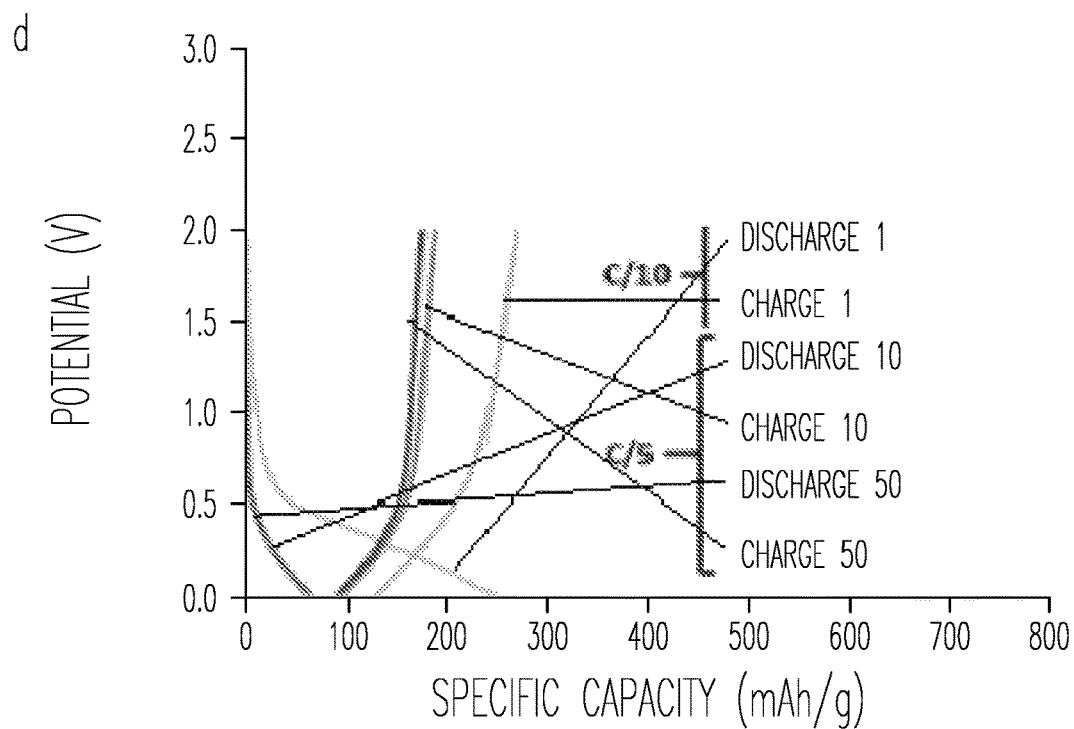

Voltage profiles were obtained from charge/discharge cycling data for cycles 1, 10 and 50, for all PM CST anodes. Voltage profiles are shown for 700CST, 900CST, 1100CST, and KOH1100CST in FIG. 12A a-d respectively. As the PT of the PM CSTs increases, the voltage plateau extends upon each step, as in between 700-900° C. and 900-1100° C. The exception is the initial cycle, shown to actually decrease after KOH-wetting (FIG. 12A c and d). The voltage plateaus of PM CSTs agree well with their respective CV measurements, with the operating voltage up to about 1.5 V.

In conclusion, a novel free-standing, binder-free, additive-free carbon anode was synthesized via pyrolysis at various temperatures, with cap skin tissue (CST) from mature A. bisporus (Portobello mushroom (PM)) as the precursor. The resulting morphology of the PM CST anodes, above PT of 900° C., is an interconnected network of hierarchically porous carbon nanoribbons. The electrochemical behaviour of PM CSTs vs. lithium was studied, exhibiting advanced performance as a free-standing anode for 700 cycles. Structural characterization by SEM indicates the PM CSTs treated at or above 900° C. become hierarchically porous, with a continuous increase in specific capacity, thus leading to the proposal that the material is self-activating due to its unusually high concentration of natural K. The performance of the PM CSTs heated to 1100° C. was also analyzed after wetting with a high-concentration KOH bath. While wetting improved the capacity for the first 50 or so cycles, it became fairly negligible in later cycles compared to the non-wetted 1100CSTs. This work will lead to new explorations into free-standing biomass-derived hierarchically porous materials for energy storage that are high-performance, extremely cheap, and environmentally benign.

Methods Section

Typical experiments entailed the following: organic PMs were purchased from local markets and cleaned with DI H₂O. The CSTs were peeled from the caps of the PMs and set aside. Razor blades were then used to slice the CSTs into quartered sections. Using a 15 mm hole punch, disk-shaped samples were obtained from CSTs. All samples were placed on silicon wafer substrates, and dried overnight at 80° C. in a vacuum oven. Before transferring the dried samples to a high-temperature tube furnace, an additional silicon wafer was placed on top of the samples to keep them relatively flat during heat-treatment. At 700 Torr, Ar gas was flowed at 300 sccm while the temperature was ramped from room temperature to 500° C. over 60 minutes, and held for 5 hours. After slowly cooling to room temperature, the samples were exposed to an additional pyrolysis at either 700 (700CST), 900 (900CST), or 1100° C. (1100CST) (ramping at approximately 10° C./min.). Once again, the temperature was then held constant for 2 hours. After cooling, the samples were placed directly into coin cell batteries for testing. Since the 1100CSTs performed the best out of the pristine samples, some of these samples were soaked in a 6M KOH solution for 10 hours at 70° C. (KOH1100CST) which were tested in batteries as well.

CR2032-type coin cells were fabricated with the as-synthesized PM CSTs as the working electrodes, microporous polypropylene as the separator (Celgard 2300), and lithium metal foil as the counter electrode. The electrolyte used was 1M LiPF₆ in a 1:1 v/v EC/DMC solvent system, with 2 wt. % VC as an additive. All batteries were prepared in an Ar-filled VAC Omni-lab glovebox, and were tested vs. lithium from 0.01 to 3V on an Arbin BT2000. CV data was collected using a Bio-logic VMP3 with a scan rate of 0.1 mV/s. The masses of the free-standing electrodes used for cycling performance characterization of 700CSTs, 900CSTs, 1100CSTs and KOH1100CSTs were 1.7 mg, 1.2 mg, 1.0 mg, and 0.5 mg, respectively. Scanning electron microscopy, and energy-dispersive X-ray spectroscopy characterization was performed using an FBI Nova Nano450SEM.

Figure 12B:
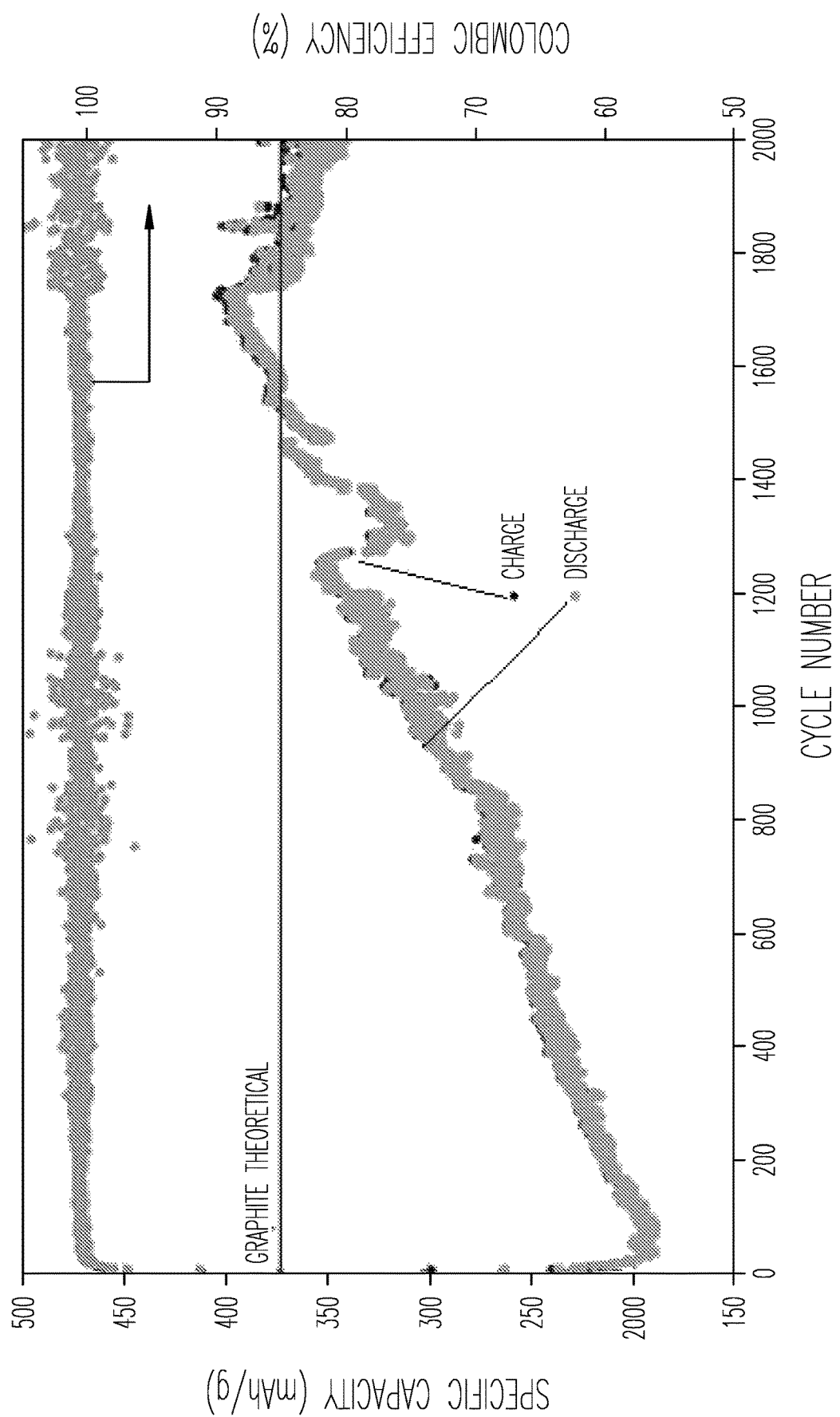
FIG. 12B shows a cyclability plot of Portobello mushroom-based free-standing carbon anodes, showing specific charge capacity, discharge capacity, and Coulombic Efficiency according to an example of the invention.
Figure 13:
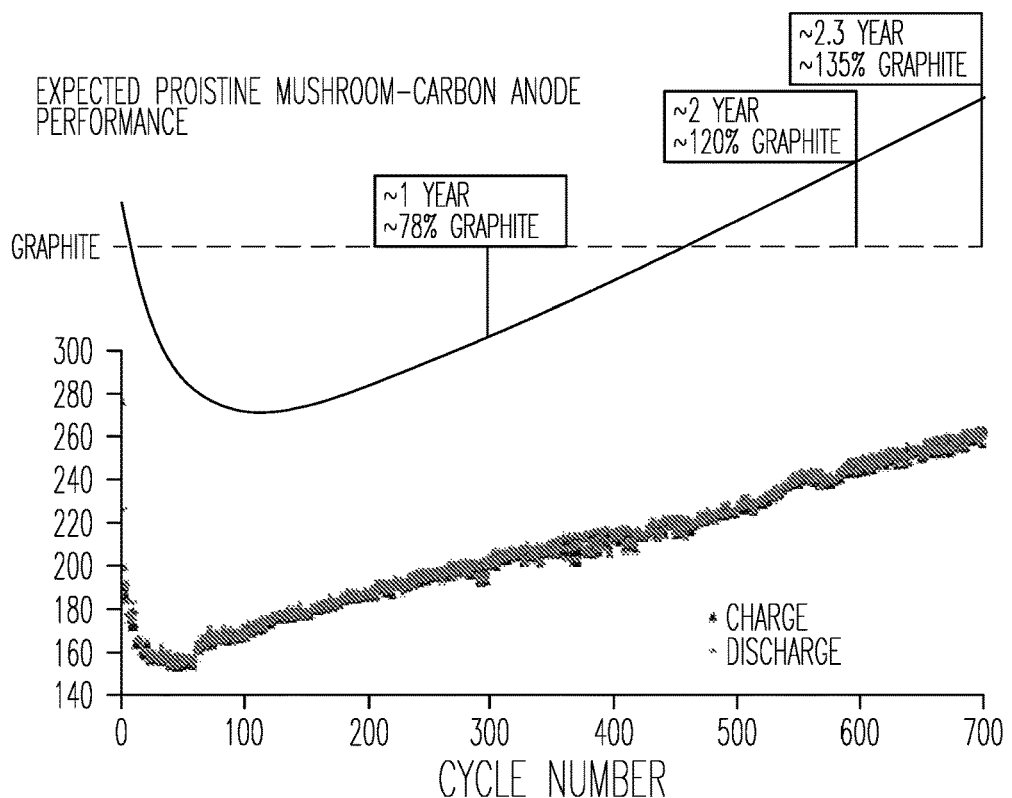
FIG. 13 shows specific capacities are based on the weight of the active material (mushroom anodes >90% active material) according to an example of the invention.
Figure 14:
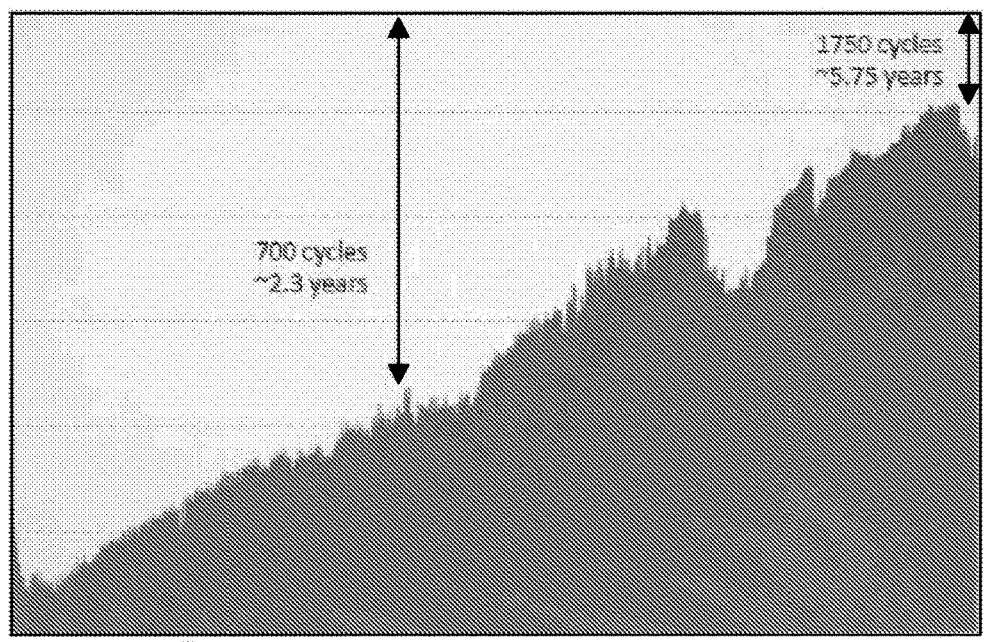
FIG. 14 shows data from the same battery as in FIG. 13 according to an example of the invention. It kept running for a very long time, until about 1750 cycles, far surpassing the performance of graphite anodes.

In addition to the above described analysis, a vast cycling sequence was carried out in which Portobello cap skin-derived, free-standing porous carbons were charged and discharged with Li at a C-rate of C/5 (based on 500 mAh/g theoretical) for 2000 cycles. 2000 cycles, as a burn-down-type test, is approximately equivalent to a real-world operational time of 6.67 years of cycling. In this time, the specific capacity of the mushroom skin-based carbon anodes continued to increase to exceptional levels. In this specific work, the anode was soaked in a 6M KOH solution for 10 hours at ~80° C. in order to wet the surface of the structure. This procedure has apparently strengthened the structured, and allowed an extended cycle life in which a break-down and re-building of the structure and/or SEI (solid-electrolyte interface occurs). It is during this lifetime extension that the capacity continues to increase. As is indicated in FIG. 12B, after just over 1500 cycles, the specific capacity exceeds the theoretical value of graphite (372 mAh/g). 1500 cycles, in such a case, is the equivalent of approximately 5 years of testing. Thus, theoretically, these mushroom skin-based carbon anodes surpass the theoretical capacity of graphite after about 5 years of use, implying that a commercialized version of this battery assembly would allow a continual increase in specific capacity for up to 5 years, at which point the capacity is greater than the incumbent commercial material (graphite). The anode then begins to degrade in a normal fashion after ca. 1700 cycles.

FIG. 12B shows a cyclability plot of Portobello mushroom-based free-standing carbon anodes, showing specific charge capacity, discharge capacity, and Coulombic Efficiency.

Figure 17:
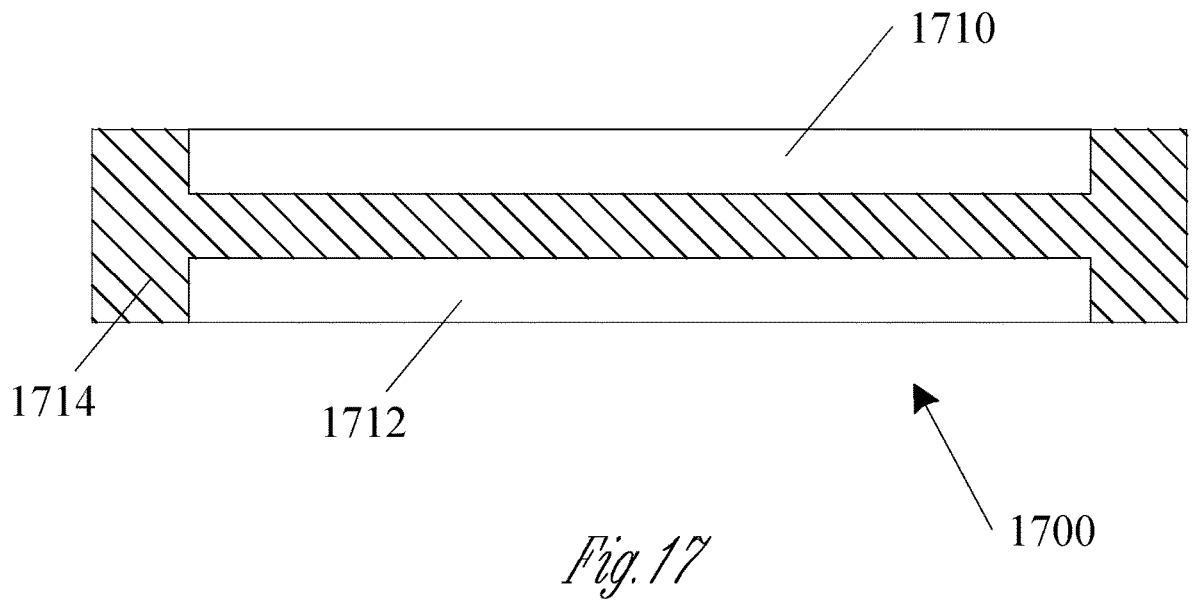
FIG. 17 shows a battery according to an example of the invention.

FIG. 17 shows an example of a battery 1700 according to an embodiment of the invention. The battery 1700 is shown including an anode 1710 and a cathode 1712. An electrolyte 1714 is shown between the anode 1710 and the cathode 1712. In one example, the battery 1700 is a lithium-ion battery. In one example, the anode 1710 is formed from carbonized mushroom tissue as described in examples above. In one example, the cathode 1712 is formed from carbonized mushroom tissue as described in examples above. In one example, the anode 1710 is formed from lithium metal as described in examples above. In one example, the cathode 1712 is formed from lithium metal as described in examples above. In one example, although the invention is not so limited, the battery 1700 is formed to comply with a 2032 coin type form factor.

Figure 18:
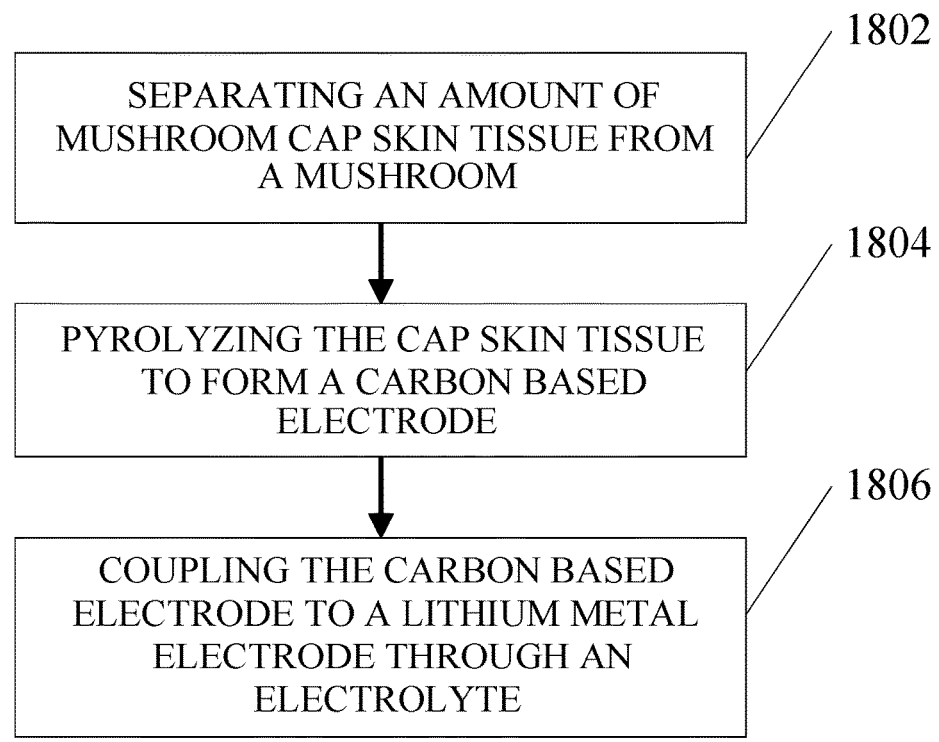
FIG. 18 shows a method of forming a battery according to an example of the invention.

FIG. 18 shows an example method of forming according to an embodiment of the invention. In operation 1802, an amount of mushroom cap skin tissue is separated from a mushroom. In operation 1804, the cap skin tissue is pyrolyzed to form a carbon based electrode. In operation 1806, the carbon based electrode is coupled to a lithium metal electrode through an electrolyte.

To better illustrate the method and apparatuses disclosed herein, a non-limiting list of example embodiments is provided here:

Example 1 includes a battery. The battery includes a first electrode with carbonized tissue from a mushroom, a second electrode, and an electrolyte in contact with both the first electrode and the second electrode.

Example 2 includes the battery of example 1, wherein the carbonized tissue from a mushroom includes carbonized cap tissue.

Example 3 includes the battery of any one of examples 1-2, wherein the carbonized tissue from a mushroom includes carbonized cap skin tissue.

Example 4 includes the battery of any one of examples 1-3, wherein the carbonized tissue from a mushroom includes carbonized stem tissue.

Example 5 includes the battery of any one of examples 1-4, wherein the carbonized tissue from a mushroom includes carbonized Portobello mushroom tissue.

Example 6 includes the battery of any one of examples 1-5, wherein the carbonized tissue is approximately 50 weight percent carbon.

Example 7 includes the battery of any one of examples 1-6, wherein the carbonized tissue is approximately 70 weight percent carbon.

Example 8 includes the battery of any one of examples 1-7, wherein the carbonized tissue is approximately 90 weight percent carbon.

Example 9 includes the battery of any one of examples 1-8, wherein the electrolyte includes $LiPF_6$.

Example 10 includes the battery of any one of examples 1-9, wherein the second electrode includes lithium metal.

Example 11 includes a method of forming a battery. The method includes separating an amount of mushroom cap skin tissue from a mushroom, pyrolyzing the cap skin tissue to form a carbon based electrode, and coupling the carbon based electrode to a lithium metal electrode through an electrolyte.

Example 12 includes the method of example 11, wherein pyrolyzing the cap skin tissue includes heating the sample at approximately 700° C.

Example 13 includes the method of any one of examples 11-12, wherein pyrolyzing the cap skin tissue includes heating the sample at approximately 900° C.

Example 14 includes the method of any one of examples 11-13, wherein pyrolyzing the cap skin tissue includes heating the sample at approximately 1100° C.

Example 15 includes the method of any one of examples 11-14, wherein pyrolyzing the cap skin tissue includes pre-drying the cap skin tissue at a temperature at or below approximately 500° C. in an inert gas atmosphere.

Example 16 includes the method of any one of examples 11-15, wherein the inert gas atmosphere is argon.

These and other examples and features of the present battery and related methods will be set forth in part in the following detailed description. This overview is intended to provide non-limiting examples of the present subject matter—it is not intended to provide an exclusive or exhaustive explanation. The detailed description above is included to provide further information about the present batteries and methods.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A battery, comprising:
   a first electrode, including:
      carbonized cap skin tissue from a mushroom, the carbonized tissue including a hierarchically porous structure wherein the carbonized tissue is approximately 50 weight percent carbon;
   a second electrode; and
   an electrolyte in contact with both the first electrode and the second electrode.

2. The battery of claim 1, wherein the carbonized tissue from a mushroom includes carbonized Portobello mushroom tissue.

3. The battery of claim 1, wherein the electrolyte includes $LiPF_6$.

4. The battery of claim 1, wherein the second electrode includes lithium metal.

5. A method of forming a battery, comprising:
   separating an amount of Portobello mushroom cap skin tissue from a mushroom;
   pyrolyzing the cap skin tissue to form a carbon based electrode; and
   coupling the carbon based electrode to a lithium metal electrode through an electrolyte.

6. A method of forming a battery, comprising:
   separating an amount of Portobello mushroom cap skin tissue from a mushroom;
   pyrolyzing the cap skin tissue to form a carbon based electrode; and
   coupling the carbon based electrode to a lithium metal electrode through an electrolyte., wherein pyrolyzing the cap skin tissue includes heating the sample at a temperature of approximately 700° C. to approximately 1100° C.

7. The method of claim 6, wherein pyrolyzing the cap skin tissue includes heating the sample at approximately 900° C.

8. The method of claim 6, wherein pyrolyzing the cap skin tissue includes heating the sample at approximately 1100° C.

9. The method of claim 6, wherein pyrolyzing the cap skin tissue includes pre-drying the cap skin tissue in an inert gas atmosphere.

10. The method of claim 9, wherein the inert gas atmosphere is argon.

11. The method of claim 6, wherein pyrolyzing the cap skin tissue includes heating the sample at approximately 700° C.

* * * * *